(12) United States Patent
Nishioka et al.

(10) Patent No.: US 11,741,925 B2
(45) Date of Patent: Aug. 29, 2023

(54) INFORMATION PROCESSING DEVICE, INFORMATION PROCESSING METHOD, AND PROGRAM

(71) Applicant: SONY GROUP CORPORATION, Tokyo (JP)

(72) Inventors: Hayato Nishioka, Tokyo (JP); Shinichi Furuya, Tokyo (JP); Masato Hirano, Tokyo (JP); Takanori Oku, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 123 days.

(21) Appl. No.: 17/604,191

(22) PCT Filed: Apr. 9, 2020

(86) PCT No.: PCT/JP2020/016004
§ 371 (c)(1),
(2) Date: Oct. 15, 2021

(87) PCT Pub. No.: WO2020/218017
PCT Pub. Date: Oct. 29, 2020

(65) Prior Publication Data
US 2022/0189443 A1    Jun. 16, 2022

(30) Foreign Application Priority Data

Apr. 23, 2019  (JP) ................................ 2019-081725
Feb. 10, 2020  (JP) ................................ 2020-020584

(51) Int. Cl.
*G10H 1/34* (2006.01)
*G10C 3/12* (2006.01)

(52) U.S. Cl.
CPC .............. *G10H 1/346* (2013.01); *G10C 3/12* (2013.01); *G10H 2220/311* (2013.01); *G10H 2220/521* (2013.01)

(58) Field of Classification Search
CPC ............. G10H 1/346; G10H 2220/311; G10H 2220/521; G10C 3/12
See application file for complete search history.

(56) References Cited

U.S. PATENT DOCUMENTS 6,525,257 B1 * 2/2003 Hermann ............... G10H 1/346
                                                341/32
7,943,843 B2 * 5/2011 Komatsu ............... G10H 1/346
                                                84/600

(Continued)

FOREIGN PATENT DOCUMENTS

JP     H0511765 A    1/1993
JP     H10-177378 A  6/1998

(Continued)

*Primary Examiner* — Robert W Horn
(74) *Attorney, Agent, or Firm* — Paratus Law Group, PLLC

(57) ABSTRACT

There is provided an information processing device, an information processing method, and a program that further improve skills. A load weight control unit controls generation of a load weight that becomes a load with respect to motion when a keyboard is depressed by a pianist, and a keystroke recognition unit recognizes motion of the keyboard. Then, the load weight control unit performs control of starting generation of a predetermined load weight at a timing when the keystroke recognition unit recognizes that the keyboard started to be depressed, and ending generation of the load weight at a timing when the keystroke recognition unit recognizes that the keyboard ended to be depressed and started to return. The present technology can be applied to, for example, a performance skill improvement system that evaluates and trains pianists' force sense.

20 Claims, 40 Drawing Sheets

(56) References Cited

U.S. PATENT DOCUMENTS

| | | | | |
|---|---|---|---|---|
| 7,947,887 | B2* | 5/2011 | Yaguchi | G10H 1/346 |
| | | | | 84/439 |
| 8,383,920 | B2* | 2/2013 | Komatsu | G10H 1/346 |
| | | | | 84/23 |
| 11,574,615 | B2* | 2/2023 | Takata | G10H 1/346 |
| 2022/0189443 | A1* | 6/2022 | Nishioka | G09B 15/08 |

FOREIGN PATENT DOCUMENTS

| | | |
|---|---|---|
| JP | 2009-047861 A | 3/2009 |
| JP | 2011-095486 A | 5/2011 |

* cited by examiner

FIG. 9
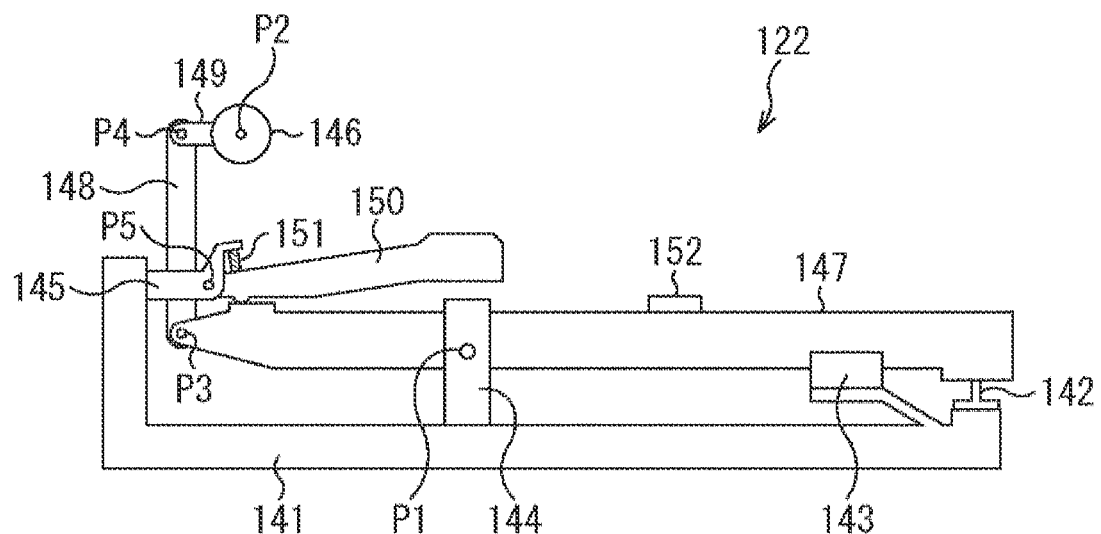
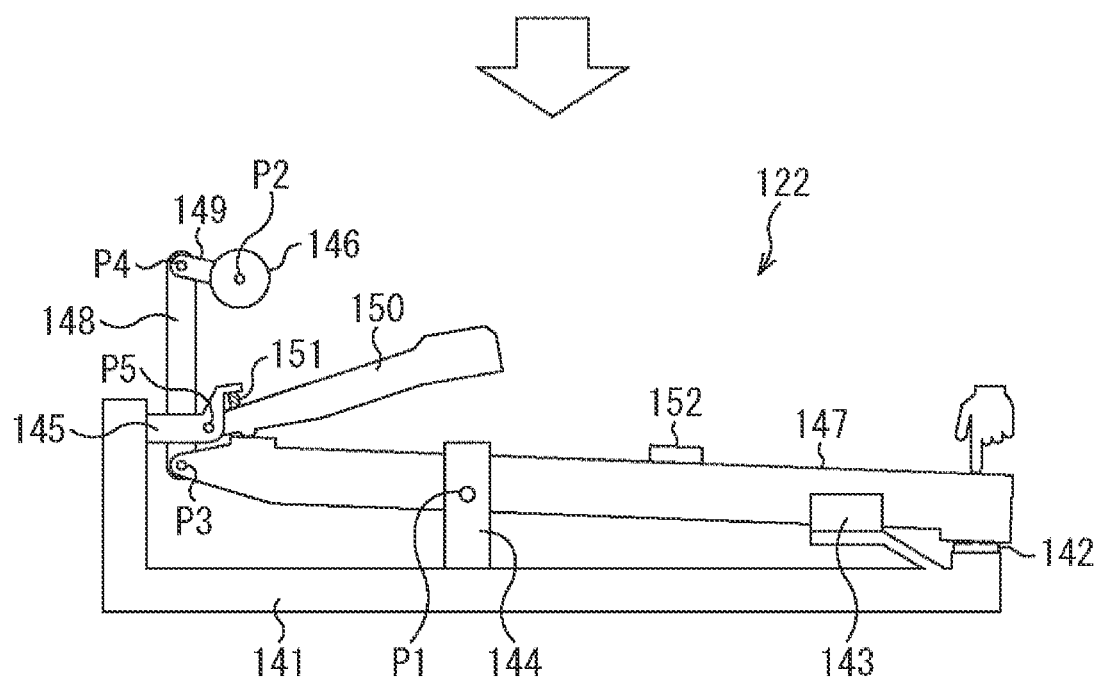

| HAPTIC SENSATION LIST | | | | | |
|---|---|---|---|---|---|
|  | A | B | C | ... | H |
| FIRST TIME | 50 | 55 | 50 |  | 50 |
| SECOND TIME | 55 | 50 | 50 |  | 50 |
| THIRD TIME | 60 | 50 | 50 |  | 50 |
| ⋮ |  |  |  |  |  |

FIG. 24
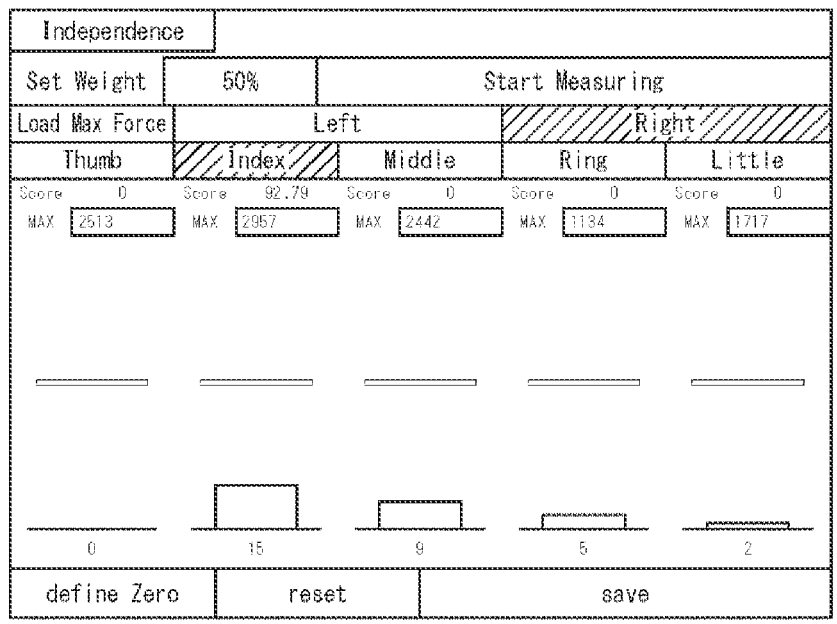
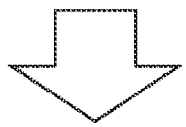
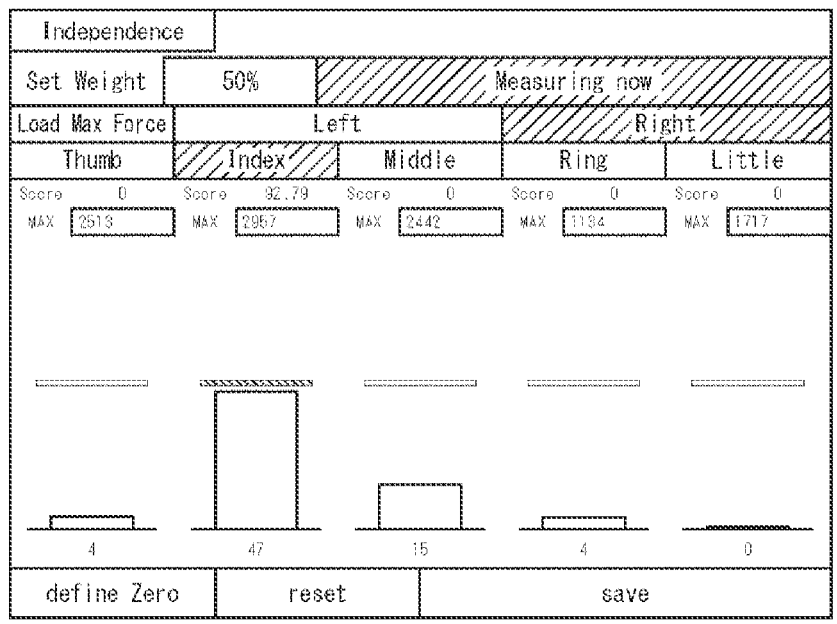

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2020/016004 (filed on Apr. 9, 2020) under 35 U.S.C. 0371, which claims priority to Japanese Patent Application Nos. 2019-081725 (filed on Apr. 23, 2019) and 2020-020584 (filed on Feb. 10, 2020), which are all hereby incorporated by reference in their entirety.

TECHNICAL FIELD

The present disclosure relates to an information processing device, an information processing method, and a program, and more particularly to an information processing device, an information processing method, and a program that further improve skills.

BACKGROUND ART

In general, performers who play musical instruments can develop tactile abilities such as fingertips through training of playing the musical instruments. Furthermore, for example, it is also considered that pianists who play the piano can improve their skills in playing the piano by improving the force sense of their fingers necessary for distinguishing force (i.e., ability to discriminate the force applied to the fingertips when depressing the keyboards of the piano).

Here, Patent Document 1 discloses a device for assisting a performance effectively assisting the performance by providing accurate evaluation of a performance note during the performance.

CITATION LIST

Patent Document

Patent Document 1: Japanese Patent Application Laid-Open No. 2009-47861

SUMMARY OF THE INVENTION

Problems to be Solved by the Invention

It has been pointed out that individual differences in force sense among pianists are irrelevant to past piano training. In other words, perceptual training for improving pianists' force sense is thought to have nothing to do with training of playing the piano. Therefore, it is expected to improve the skill of playing the piano by giving training and evaluation for improving pianists' force sense separately from training of playing the piano.

The present disclosure has been made in view of such circumstances, and is intended to further improve skills.

Solutions to Problems

An information processing device according to one aspect of the present disclosure includes a load weight control unit that controls generation of a load weight that becomes a load with respect to a motion when a user depresses a depression target object, and a recognition unit that recognizes a motion of the depression target object, in which the load weight control unit performs control of starting generation of the load weight that is predetermined at a timing when the recognition unit recognizes that the depression target object has started to be depressed, and ending generation of the load weight at a timing when the recognition unit recognizes that the depression target object ended to be depressed and started to return.

An information processing method or a program of one aspect of the present disclosure includes controlling generation of a load weight that becomes a load with respect to a motion when a user depresses a depression target object, and recognizing a motion of the depression target object, and performs control of starting generation of the load weight that is predetermined at a timing when the depression target object has started to be depressed is recognized, and ending generation of the load weight at a timing when the depression target object ended to be depressed and started to return is recognized.

In one aspect of the present disclosure, generation of a load weight that becomes a load with respect to a motion when the user depresses the depression target object is controlled, and a motion of the depression target object is recognized. Then, control of starting generation of the load weight that is predetermined at a timing when the depression target object has started to be depressed is recognized, and ending generation of the load weight at a timing when the depression target object ended to be depressed and started to return is recognized, is performed.

BRIEF DESCRIPTION OF DRAWINGS

FIG. 9 is a view explaining an operation of the haptic presentation unit.

FIG. 24 is a view showing a display example of an independence measurement screen.

MODE FOR CARRYING OUT THE INVENTION

A specific embodiment to which the present technology is applied will be described below in detail with reference to the drawings.

<First Configuration Example of Performance Skill Improvement System>

Figure 1:
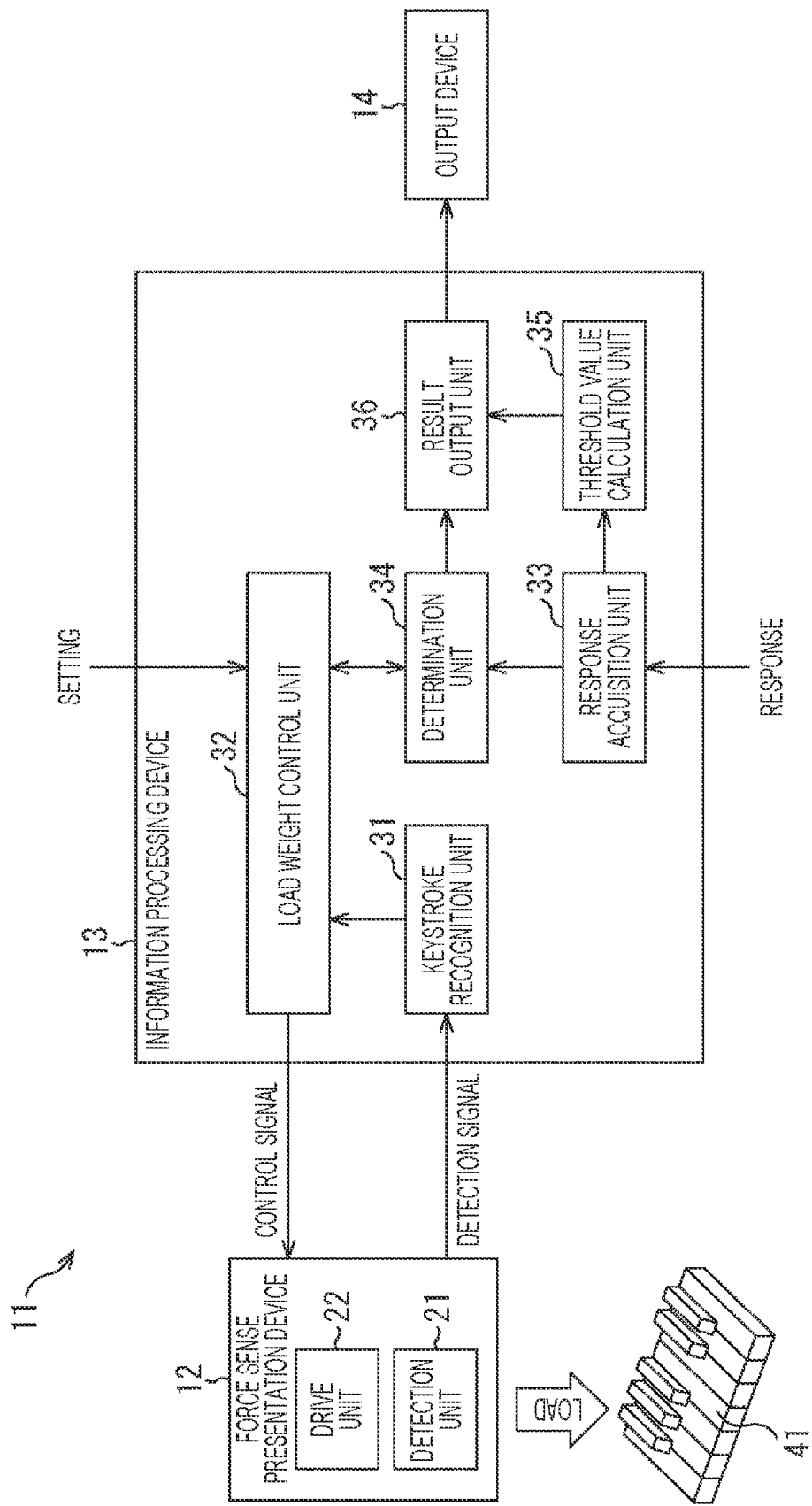
FIG. 1 is a block diagram showing a configuration example of a first embodiment of a performance skill improvement system to which the present technology is applied.

FIG. 1 is a block diagram showing a configuration example of the first embodiment of the performance skill improvement system to which the present technology is applied.

A performance skill improvement system 11 is built for the purpose of supporting a performer playing a musical instrument so that his/her performance skill is improved by improving his/her force sense. Note that in the following, as an example, a force sense when a pianist depresses a keyboard 41 using the performance skill improvement system 11 will be described, but the performance skill improvement system 11 may be applied to a musical instrument other than the piano.

For example, the performance skill improvement system 11 can execute the force sense discrimination processing, the force sense evaluation processing, and the force sense training processing. For example, as described later with reference to the flowchart of FIG. 4, the force sense discrimination processing is processing in which the pianist compares and discriminates force senses obtained by two keystrokes on the keyboard 41 by the pianist, where the force required to depress the keyboard 41 in the first keystroke is defined as a normal weight and the force required to depress the keyboard 41 in the second keystroke is defined as a larger weight than the normal weight.

Furthermore, as described later with reference to the flowchart of FIG. 5, the force sense evaluation processing is processing of evaluating force sense by randomly changing the force required to depress the keyboard 41 and detecting a threshold value at which the pianist feels the keyboard 41 heavy. Furthermore, as described later with reference to the flowchart of FIG. 6, the force sense training processing is processing of training force sense by randomly changing the force required to depress the keyboard 41 and providing feedback to a response as to whether or not the pianist felt the keyboard 41 heavy.

As shown in FIG. 1, the performance skill improvement system 11 includes a force sense presentation device 12, an information processing device 13, and an output device 14. The force sense presentation device 12 has a detection unit 21 and a drive unit 22, and the information processing device 13 has a keystroke recognition unit 31, a load weight control unit 32, a response acquisition unit 33, a determination unit 34, a threshold value calculation unit 35, and a result output unit 36.

The force sense presentation device 12 is a device capable of presenting a desired force sense to a user by generating a force that becomes a load (hereinafter referred to as load weight) with respect to a motion of an object depressed by the user. For example, the force sense presentation device 12 can be attached to or incorporated in the keyboard 41, and can present a desired haptic sensation to the pianist depressing the keyboard 41 by generating a load weight with respect to a motion of depressing the keyboard 41.

The information processing device 13 performs information processing according to a preset load weight, a response input by the pianist who does training, a detection signal output from the force sense presentation device 12, and the like, and outputs a control signal that controls the load weight to be generated in the force sense presentation device 12.

The output device 14 includes a display, a speaker, and the like. For example, in the force sense training processing (see FIG. 6), the output device 14 displays characters indicating correct or incorrect answers, or outputs a voice indicating correct or incorrect answers, as a correct/incorrect result for the response as to whether or not the pianist felt the keyboard 41 heavy. Furthermore, the output device 14 displays a threshold value, which is calculated by the threshold value calculation unit 35 in the force sense evaluation processing (see FIG. 5) and serves as an index indicating the load weight that can be discriminated by the pianist.

The detection unit 21 detects a motion (upward motion or downward motion) when the pianist depresses the keyboard 41, and outputs a detection signal indicating the motion. For example, the detection unit 21 can be configured by a speed sensor incorporated in the keyboard 41, and can output, as a detection signal, a speed varying according to the motion of the keyboard 41.

In accordance with a control signal output from the information processing device 13, the drive unit 22 generates a load weight that becomes a load with respect to the pianist depressing the keyboard 41. For example, the drive unit 22 can be configured by combining a motor, a drive mechanism, and the like, and by transmitting a force generated by the motor to the keyboard 41 by the drive mechanism, generates a load weight having a size in accordance with the control signal.

Figure 2:
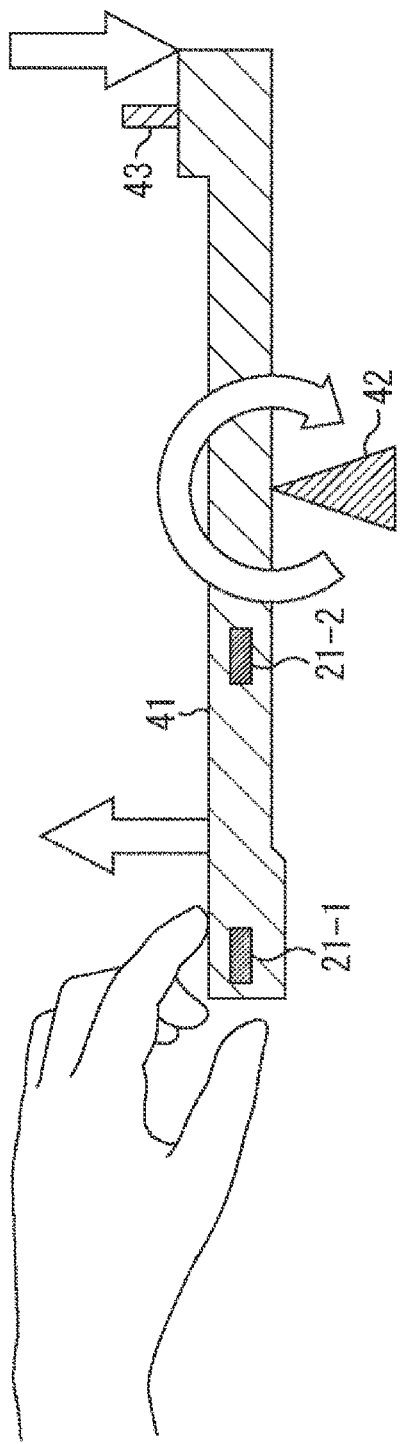
FIG. 2 is a view explaining the force applied to a keyboard.

Here, the drive unit 22 can be configured to apply, to the keyboard 41, a force in an orientation shown by a white arrow in FIG. 2. For example, the drive unit 22 can be configured with a haptics device so as to apply a force in an orientation where the keyboard 41 is pulled up by joining the drive unit 22 to the surface of the keyboard 41 that the pianist keys with his/her fingers.

Alternatively, the drive unit 22 can be configured so as to apply a force to a fulcrum 42 of the keyboard 41 in an orientation where the keyboard 41 is pushed down relative to an end near a capstan button 43 provided on the opposite side to the keyboard surface. Alternatively, the drive unit 22 can be configured with a torque motor so as to transmit torque in the rotational direction about the fulcrum 42 of the keyboard 41. Note that in a case where the torque motor is employed as the drive unit 22, an encoder can be used as the detection unit 21. Furthermore, in a case where a pressure sensor is used as the detection unit 21, the pressure sensor may be disposed at a plurality of places of the keyboard 41 as in detection units 21-1 and 21-2 shown in FIG. 2.

The keystroke recognition unit 31 recognizes the motion of the keyboard 41 (keystroke based on downward motion or key release based on upward motion) on the basis of the detection signal output from the detection unit 21, and gives notice based on the recognition to the load weight control unit 32. For example, in a case where the keystroke recognition unit 31 recognizes that the second keystroke has been performed on the keyboard 41 in the force sense discrimination processing (see FIG. 4), the keystroke recognition unit 31 notifies the load weight control unit 32 of the second keystroke having been performed on the keyboard 41. Note that the keystroke recognition unit 31 may be configured to recognize the motion of the keyboard 41 by performing image processing on an image (moving image or video) captured by an image-capturing device (not illustrated), for example, in addition to the detection signal output from the detection unit 21.

The load weight control unit 32 controls the load weight applied to the keyboard 41 by the drive unit 22, and outputs a control signal instructing the load weight. The load weight control unit 32 controls the load weight so that, for example, the force required for the pianist to depress the keyboard 41 becomes a load weight set from the outside, a load weight obtained as a threshold value by the threshold value calculation unit 35, or the like. Furthermore, the load weight control unit 32 performs control of starting generation of the load weight at a timing when the keystroke recognition unit 31 recognizes that the keyboard 41 started to be depressed, and ending generation of the load weight at a timing when the keystroke recognition unit 31 recognizes that the keyboard 41 ended to be depressed and started to return.

For example, in the force sense discrimination processing (see FIG. 4), when the keystroke recognition unit 31 notifies the keyboard 41 that the second keystroke has been performed, the load weight control unit 32 outputs a control signal instructing a predetermined load weight in 0.1 to 1.4 [N]. Furthermore, in the force sense evaluation processing (see FIG. 5), the load weight control unit 32 randomly selects, from the range of 0.1 [N] to 1.4 [N], a load weight to be applied to the keyboard 41 by the drive unit 22, and outputs a control signal instructing the selected load weight. Furthermore, in the force sense training processing (see FIG. 6), the load weight control unit 32 randomly selects any one of the load weight according to the setting and 0 [N], and outputs a control signal instructing the selected load weight. Moreover, in a case where the load weight control unit 32 can discriminate the load weight according to the setting (gives correct answer at a certain ratio or more) in the force sense training processing (see FIG. 6), the load weight control unit 32 changes the presentation to a smaller load weight.

The response acquisition unit 33 acquires the response of the pianist using a switch (not illustrated) or the like, for example, and supplies the acquired response to the determination unit 34 or the threshold value calculation unit 35. For example, in the force sense evaluation processing (see FIG. 5) and the force sense training processing (see FIG. 6), the response acquisition unit 33 acquires responses such as "I felt the key stroke heavier" and "I did not feel the key stroke heavier" than normal. Note that as a switch for the pianist to input a response, the pianist may use any keyboard other than the keyboard 41 on which the force sense presentation device 12 is mounted, for example. That is, the keyboard of a certain musical scale can be used for inputting a response "I felt the key stroke heavier", and the keyboard of another musical scale can be used for inputting a response "I did not feel the key stroke heavier".

In accordance with the control of the load weight by the load weight control unit 32, the determination unit 34 determines whether or not the response acquired by the response acquisition unit 33 is correct and supplies, to the result output unit 36, the correct/incorrect result for the response. For example, in the force sense training processing (see FIG. 6), in a case where the load weight control unit 32 controls the drive unit 22 so that the load weight according to the setting is applied to the keyboard 41, the determination unit 34 determines that the response is correct if the response is "I felt the key stroke heavier". Furthermore, in this case, if the response is "I did not feel the key stroke heavier", the determination unit 34 determines that the response is incorrect. On the other hand, in a case where the load weight control unit 32 controls the drive unit 22 so that 0 [N] is applied to the keyboard 41, the determination unit 34 determines that the response is incorrect if the response is "I felt the key stroke heavier", and determines that the response is correct if the response is "I did not feel the key stroke heavier".

In order to evaluate the force sense of the pianist, the threshold value calculation unit 35 calculates a threshold value to be an index indicating the load weight that can be discriminated by the pianist. For example, in the force sense evaluation processing (see FIG. 5), the threshold value calculation unit 35 calculates a threshold value on the basis of the ratio of the responses of "I felt the key stroke heavier" to each of a plurality of load weight among the responses of a specified number of times for each load weight to be supplied from the response acquisition unit 33.

Figure 3:
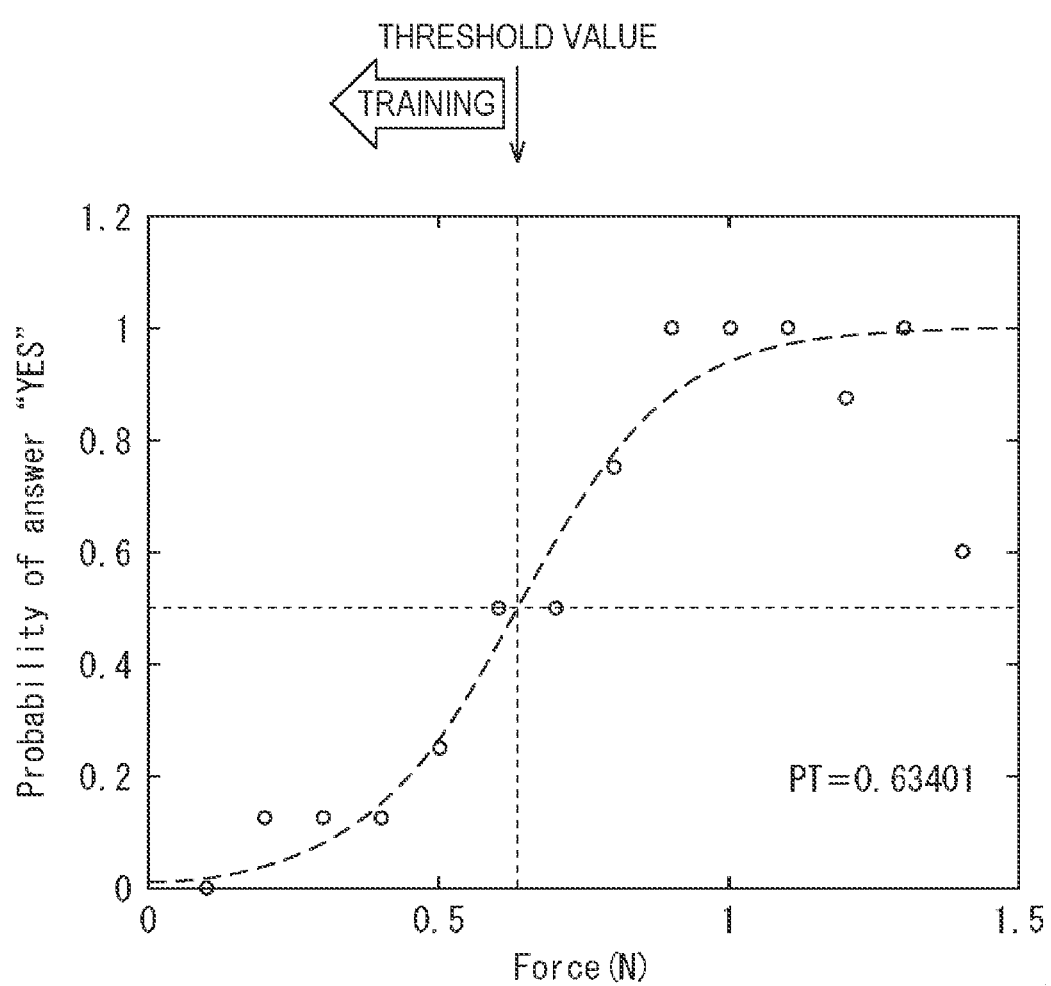
FIG. 3 is a view explaining a threshold value of a load weight that can be discriminated.

Specifically, as shown in FIG. 3, the threshold value calculation unit 35 performs fitting using a sigmoid function. In FIG. 3, the horizontal axis indicates the load weight, and the vertical axis indicates the ratio of the response of "I felt the key stroke heavier" to each load weight. Then, the threshold value calculation unit 35 calculates the load weight that is an inflection point in the fitting curve as a threshold value which is a load weight that can be discriminated by the pianist. For example, when the pianist becomes able to discriminate a smaller load weight through training by the force sense training processing (see FIG. 6), it is expected that this threshold value can be reduced.

The result output unit 36 outputs, to the output device 14, the correct/incorrect result determined by the determination unit 34 or the threshold value calculated by the threshold value calculation unit 35. Furthermore, the result output unit 36 may also output a fitting curve using a sigmoid function as shown in FIG. 3 and display the fitting curve on the display of the output device 14.

The performance skill improvement system 11 configured as described above can perform perception training for improving the pianist's force sense, besides the training of playing the piano. Therefore, as a result of improving the pianist's force sense, the performance skill of the pianist can be further improved, and the performance skill improvement system 11 can support the pianist to perform a more skillful performance.

<Processing Executed by Performance Skill Improvement System>

The processing executed by the performance skill improvement system 11 will be described with reference to the flowcharts shown in FIGS. 4 to 6. Note that each of the following processing is controlled at 1 kHz, for example.

Figure 4:
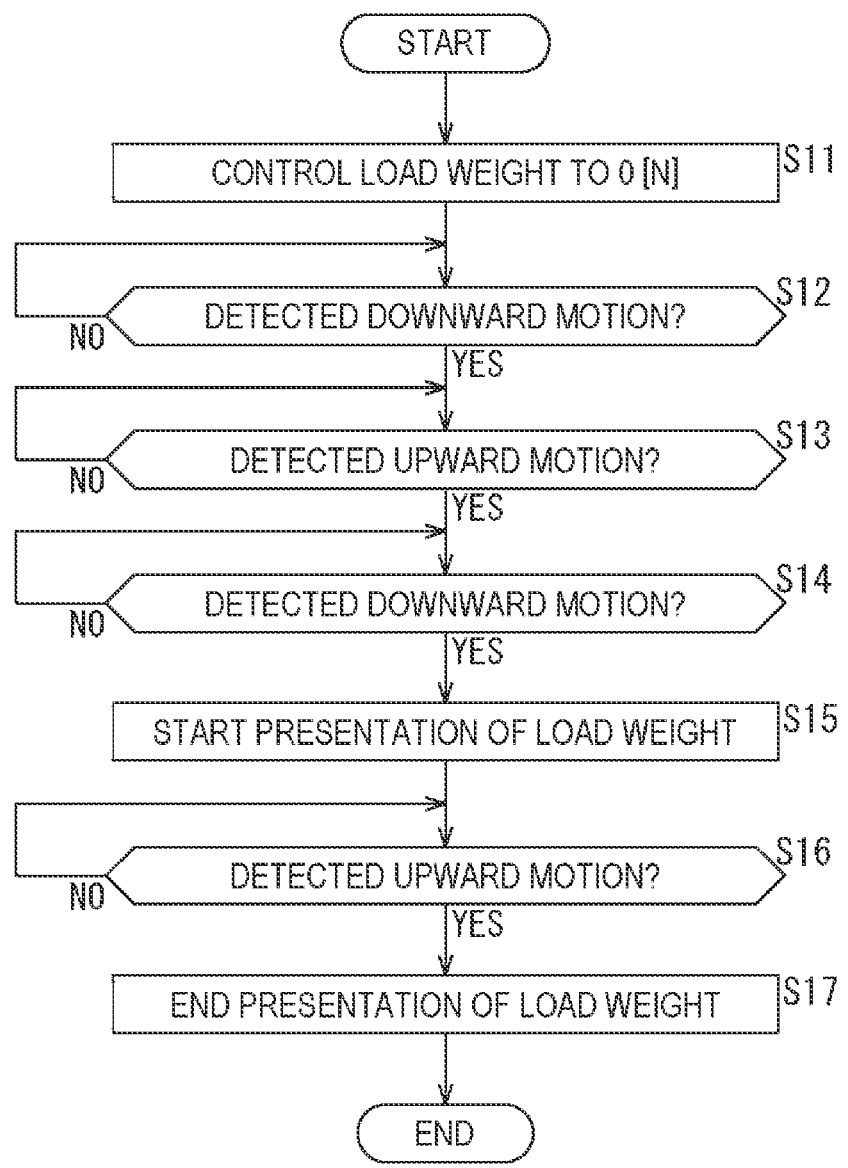
FIG. 4 is a flowchart explaining force sense discrimination processing.

FIG. 4 shows a flowchart explaining the force sense discrimination processing executed by the performance skill improvement system 11.

For example, when an instruction for performing the force sense discrimination processing is input to the information processing device 13, the processing is started, and in step S11, the load weight control unit 32 outputs a control signal for instructing the load weight applied to the keyboard 41 by the drive unit 22 to be 0 [N]. In response to this, in the force sense presentation device 12, the drive unit 22 drives the load weight applied to the keyboard 41 in the first keystroke to become 0 [N], and the force required for the pianist to depress the keyboard 41 becomes a normal weight. Note that for example, in a case of a configuration where the own weight of the force sense presentation device 12 is applied to the keyboard 41, the load weight control unit 32 drives the drive unit 22 to cancel the own weight of the force sense presentation device 12.

In step S12, the keystroke recognition unit 31 determines whether or not the keyboard 41 has started a downward motion (keystroke) on the basis of a detection signal output from the detection unit 21 of the force sense presentation device 12. Then, the keystroke recognition unit 31 waits the processing until it determines that the keyboard 41 has started a downward motion, and when determining that the keyboard 41 has started a downward motion, the processing proceeds to step S13.

In step S13, the keystroke recognition unit 31 determines whether or not the keyboard 41 has started an upward movement (key release) on the basis of a detection signal output from the detection unit 21 of the force sense presentation device 12. Then, the keystroke recognition unit 31 waits the processing until it determines that the keyboard 41 has started an upward motion, and when determining that the keyboard 41 has started an upward motion, the processing proceeds to step S14.

Thus, when the start of downward motion of the keyboard 41 is detected in step S12 and the start of upward motion of the keyboard 41 is detected in step S13, the first keystroke on the keyboard 41 is performed.

In step S14, similarly to step S12, the keystroke recognition unit 31 waits the processing until it determines that the keyboard 41 has started a downward motion (keystroke), and if it determines that the keyboard 41 has started a downward motion, the processing proceeds to step S15.

In step S15, the keystroke recognition unit 31 notifies the load weight control unit 32 that the second keystroke on the keyboard 41 has started, and the presentation of the load weight is started. That is, the load weight control unit 32 outputs a control signal for instructing the load weight applied to the keyboard 41 by the drive unit 22 to be a predetermined load weight set in advance. In response to this, in the force sense presentation device 12, the drive unit 22 drives a predetermined load weight to be applied to the keyboard 41 in the second keystroke, and the force required for the pianist to depress the keyboard 41 becomes a larger weight (normal weight and load weight) than normal.

In step S16, similarly to step S13, the keystroke recognition unit 31 waits the processing until it determines that the keyboard 41 has started an upward movement (key release), and if it determines that the keyboard 41 has started an upward motion, the processing proceeds to step S17.

In step S17, the keystroke recognition unit 31 notifies the load weight control unit 32 that the second keystroke on the keyboard 41 ends, and the presentation of the load weight is ended. That is, the load weight control unit 32 outputs a control signal for instructing the load weight applied to the keyboard 41 by the drive unit 22 to be 0 [N]. In response to this, in the force sense presentation device 12, the drive unit 22 drives the load weight applied to the keyboard 41 to become 0 [N], and the force required for the pianist to depress the keyboard 41 becomes a normal weight. Note that for example, in a case of a configuration where the own weight of the force sense presentation device 12 is applied to the keyboard 41, the load weight control unit 32 continues to drive the drive unit 22 to cancel the own weight of the force sense presentation device 12.

Then, after the processing in step S17, the force sense discrimination processing is ended.

As described above, when the performance skill improvement system 11 executes the force sense discrimination processing, the pianist can discriminate the load weight by comparing the force of depressing the keyboard 41 by the first keystroke with the force of depressing the keyboard 41 by the second keystroke.

Figure 5:
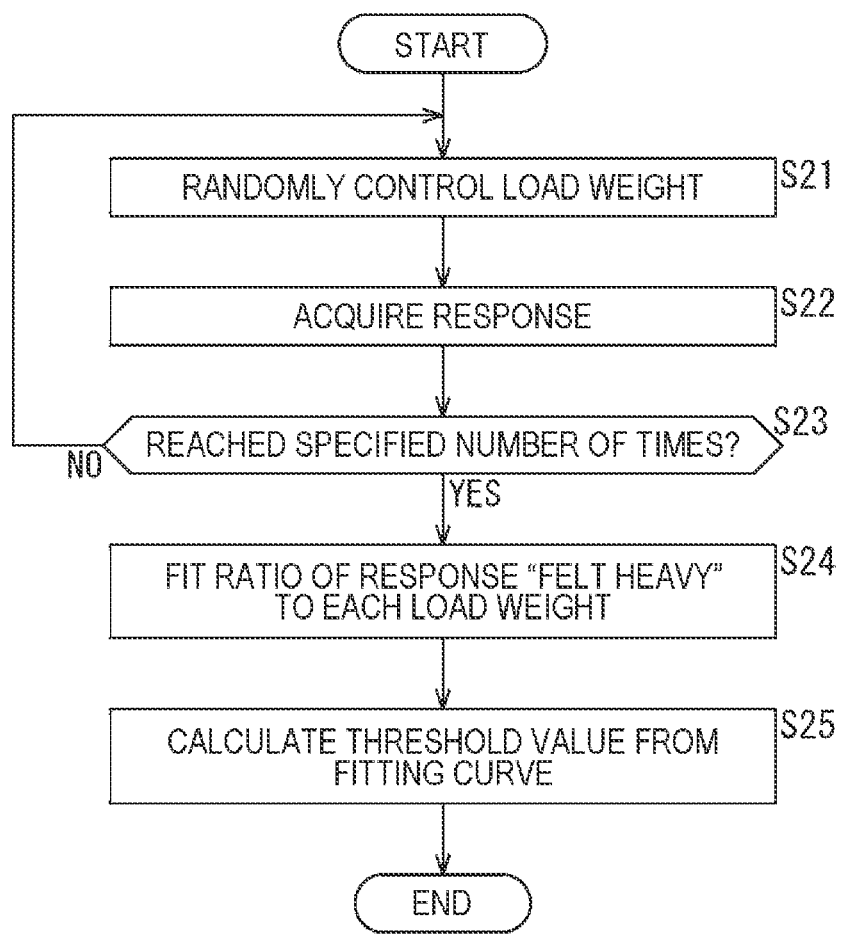
FIG. 5 is a flowchart explaining the force sense evaluation processing.

FIG. 5 shows a flowchart explaining the force sense evaluation processing executed by the performance skill improvement system 11.

For example, when an instruction for performing the force sense evaluation processing is input to the information processing device 13, the processing is started, and in step S21, the load weight control unit 32 randomly selects a load weight to be applied to the keyboard 41 by the drive unit 22 from, for example, a range from 0.1 [N] to 1.4 [N]. Then, the load weight control unit 32 outputs a control signal instructing the load weight to be the selected load weight. In response to this, in the force sense presentation device 12, the drive unit 22 drives the load weight selected randomly by the load weight control unit 32 to be applied to the keyboard 41, and the force required for the pianist to depress the keyboard 41 becomes a larger weight (normal weight and load weight) than normal.

In step S22, after the pianist performs keystroke on the keyboard 41, when the pianist inputs a response by selecting one of "I felt the key stroke heavier" and "I did not feel the key stroke heavier" than normal, the response acquisition unit 33 acquires the response.

In step S23, the response acquisition unit 33 determines whether or not the number of times of presenting each load weight randomly controlled in step S21 has reached a predetermined specified number of times (e.g., 20 times per load weight).

In a case where the response acquisition unit 33 determines in step S23 that the number of times of presenting each load weight has not reached the specified number of times, the processing returns to step S21, and the similar processing is repeated thereafter. On the other hand, in a case where the response acquisition unit 33 determines in step S23 that the number of times of presenting each load weight has reached the specified number of times, the processing proceeds to step S24.

In step S24, the response acquisition unit 33 supplies, to the threshold value calculation unit 35, all the responses acquired in step S22 for each load weight by repeating the specified number of times. Then, the threshold value calculation unit 35 performs fitting of the ratio of the response of "I felt the key stroke heavier" to each load weight by a sigmoid function as shown in FIG. 3 described above.

In step S25, the threshold value calculation unit 35 calculates, as a threshold value, the load weight that is the inflection point in the fitting curve obtained in step S24, and outputs the threshold value to the output device 14 via the result output unit 36.

Then, after the processing of step S25, the force sense evaluation processing is ended.

As described above, when the performance skill improvement system 11 executes the force sense evaluation processing, it is possible to obtain the threshold value of the load weight that can be discriminated by the pianist, i.e., to accurately evaluate the pianist's force sense.

Figure 6:
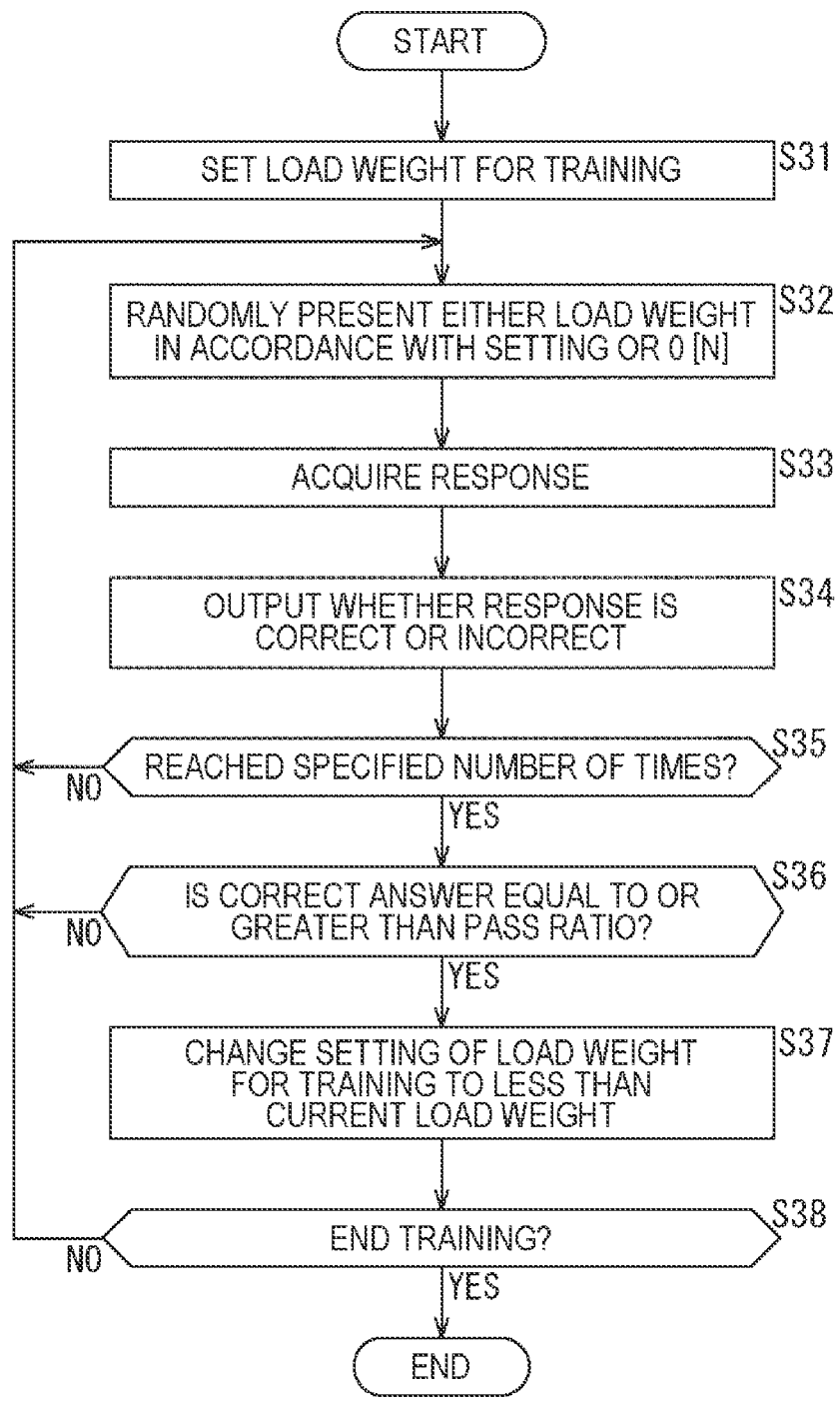
FIG. 6 is a flowchart explaining force sense training processing.

FIG. 6 shows a flowchart explaining the force sense training processing executed by the performance skill improvement system 11.

For example, when an instruction for performing the force sense training processing is input to the information processing device 13, the processing is started, and in step S31, the load weight control unit 32 sets the load weight to be trained. Here, the load weight control unit 32 can use, for training, a load weight set by the pianist using a setting unit (not illustrated), for example, and can also use, for training, a load weight calculated as a threshold value in the force sense evaluation processing of FIG. 5.

In step S32, the load weight control unit 32 randomly selects any one of the load weight according to the setting in step S31 and 0 [N], and outputs a control signal instructing the load weight to be the selected load weight. In response to this, in the force sense presentation device 12, the drive unit 22 drives the load weight selected randomly by the load weight control unit 32 to be applied to the keyboard 41. Thus, the force required for the pianist to depress the keyboard 41 is either a weight larger than normal (normal weight and load weight) or a normal weight.

In step S33, after the pianist performs keystroke on the keyboard 41, when the pianist inputs a response by selecting one of "I felt the key stroke heavier" and "I did not feel the key stroke heavier" than normal, the response acquisition unit 33 acquires the response.

In step S34, the determination unit 34 acquires the load weight (i.e., the load weight according to the setting in step S31, or 0 [N]) selected by the load weight control unit 32 in step S32, and acquires the response acquired by the response acquisition unit 33 in step S33. Then, the determination unit 34 determines whether or not the response of the pianist is correct, and outputs a correct/incorrect result for the response to the output device 14 via the result output unit 36 to feed back to the pianist.

In step S35, the response acquisition unit 33 determines whether or not the number of times of presenting the load weight to be randomly selected in step S32 has reached a predetermined specified number of times (e.g., 20 times).

In a case where the response acquisition unit 33 determines in step S35 that the number of times of presenting the load weight has not reached the specified number of times, the processing returns to step S32, and the similar processing is repeated thereafter. On the other hand, in a case where the response acquisition unit 33 determines in step S35 that the number of times of presenting the load weight has reached the specified number of times, the processing proceeds to step S36.

In step S36, the determination unit 34 determines whether or not the ratio of correct responses in the correct/incorrect results is equal to or greater than a predetermined pass ratio (e.g., 80%) for the specified number of times acquired in step S34 by repeating the specified number of times.

In a case where the determination unit 34 determines in step S36 that the ratio of correct responses in the correct/incorrect results is not equal to or greater than the predetermined pass ratio (i.e., less than the predetermined pass ratio), the processing returns to step S32, and the similar processing is repeated thereafter. On the other hand, in a case where the determination unit 34 determines in step S36 that the ratio of correct responses in the correct/incorrect results is equal to or greater than the predetermined pass ratio, the processing proceeds to step S37.

In step S37, the load weight control unit 32 changes the setting of the load weight for training to less than the current load weight (for example, 90% of the currently set load weight). Note that the load weight control unit 32 may adjust the change amount in the load weight in accordance with the ratio of correct responses in the correct/incorrect results, for example, in a case where the ratio of correct responses in the correct/incorrect results is high (for example, in a case where almost all responses are correct), the load weight control unit 32 can adjust the change amount in the load weight to become large.

In step S38, the load weight control unit 32 determines whether or not to end the training. For example, in a case where the number of times of changing the load weight in step S37 is set in advance, the load weight control unit 32 determines to end the training when as many changes for the load weight are performed as the number of times of changes. Other than that, the training may be ended on the basis of the length of time for the training (for example, 30 minutes), the number of times the pianist gave responses (20 times of giving responses for 20 types of load weights), and the like.

In a case where the load weight control unit 32 determines in step S38 not to end the training, the processing returns to step S32, and the similar processing is repeated thereafter. On the other hand, in a case where the load weight control unit 32 determines in step S38 to end the training, the force sense training processing is ended.

As described above, when the performance skill improvement system 11 executes the force sense training processing, it is possible to lower the threshold value at which the pianist can discriminate the load weight, i.e., to improve the pianist's force sense by giving the pianist feedback of the correct/incorrect results to the responses. It is possible to improve the force sense more efficiently, in particular by using, in the force sense training processing, the load weight in the vicinity of the threshold value obtained in the force sense evaluation processing.

Note that the performance skill improvement system 11 is used to improve the performance skill of a performer who plays a musical instrument, and can also be applied to improve various types of skills associated with improvement of the user's force sense. For example, it is known that accidents increase in the elderly due to a decrease in the tactile function, a decrease in the ability to hold an object, and the like. It is possible to prevent accidents by improving the force sense of the elderly by the performance skill improvement system 11. Furthermore, the performance skill improvement system 11 is expected to improve the tactile sense for reading Braille and to suppress the decrease in the tactile sense function caused by a stroke or the like. Alternatively, in an occupation requiring a high level of tactile sense such as a potter, use of the performance skill improvement system 11 is expected to improve the skills and also to solve the problem of shortage of successors.

Furthermore, the performance skill improvement system 11 performs control of starting generation of the load weight at a timing when it is recognized that the keyboard 41 started to be depressed and of ending generation of the load weight at a timing when it is recognized that the keyboard 41 ended to be depressed and started to return. Thus, by changing the weight of the keyboard 41 that the pianist feels when depressing the keyboard 41, it is possible to freely manipulate the haptic sensation (perceptual experience) that the pianist experiences. Moreover, the performance skill improvement system 11 can improve the pianist's discriminability of the haptic sensation by presenting (giving feedback), to the pianist after keystroke by the pianist, information in which the load weight is generated on the keyboard 41 or information in which generation of the load weight is stopped on the keyboard 41.

Here, by changing the control algorithm of the performance skill improvement system 11, it is possible for the user to experience, through his/her fingertips, not only training of haptic sensation but also various forces, and it is possible for the user to experience the keyboard 41 of various weights. Therefore, the performance skill improvement system 11 can be used in training in which the pianist quickly adapts to a new piano to play with unknown weight of the keyboard 41 (i.e., shorten the adaptive time required to produce a sound with a volume as desired). This is based on the neuroscientific knowledge that "experiencing keyboards of various weights forms a brain circuit matching the correspondence relationship between the weight of the keyboard and sound, and referring to the memory accelerates adaptation to a new piano keyboard with unknown mechanical characteristics".

Furthermore, the performance skill improvement system 11 can measure information on the vertical position of the keyboard 41, time series information on the speed, and the like by a single unit of the detection unit 21, and give feedback of those measurement results to the user.

Note that in the description of the embodiment described above, the performance skill improvement system 11 is configured to generate a load weight on the keyboard 41 so that the pianist feels it heavy. However, it may be configured to generate a load weight on the keyboard 41 so that the pianist feels it light, for example. In this case, the response acquisition unit 33 acquires responses "I felt the key stroke lighter" or "I did not feel the key stroke lighter" than normal in the force sense evaluation processing (see FIG. 5) and the force sense training processing (see FIG. 6).

<Second Configuration Example of Performance Skill Improvement System>

Figure 7:
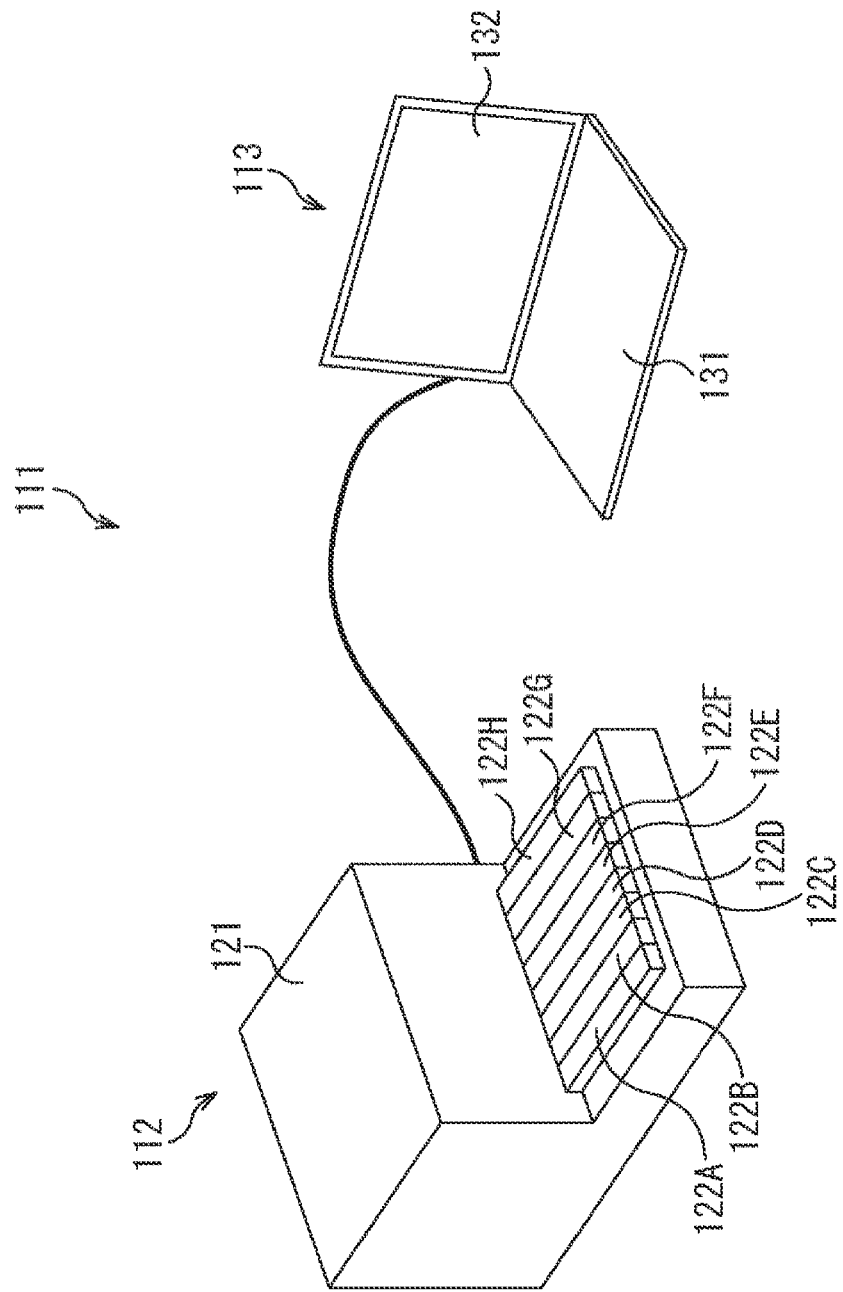
FIG. 7 is a diagram showing a configuration example of a second embodiment of the performance skill improvement system to which the present technology is applied.

FIG. 7 is a diagram showing a configuration example of the second embodiment of the performance skill improvement system to which the present technology is applied.

For example, the performance skill improvement system 111 is configured to allow evaluation or training of haptic sensation in a plurality of fingers, and can assist the performer in improving performance skills by evaluating or training the sensorimotor integration function.

As shown in FIG. 7, the performance skill improvement system 111 includes a haptic presentation device 112 and an information processing device 113.

The haptic presentation device 112 includes a plurality of haptic presentation units 122 incorporated into a housing 121. For example, FIG. 7 shows a configuration example of the haptic presentation device 112 having eight haptic presentation units 122A to 122H. Note that the haptic presentation units 122A to 122H have a similar configuration, and in a case where there is no need to distinguish them, they are hereinafter referred to as a haptic presentation unit 122.

Figure 8:
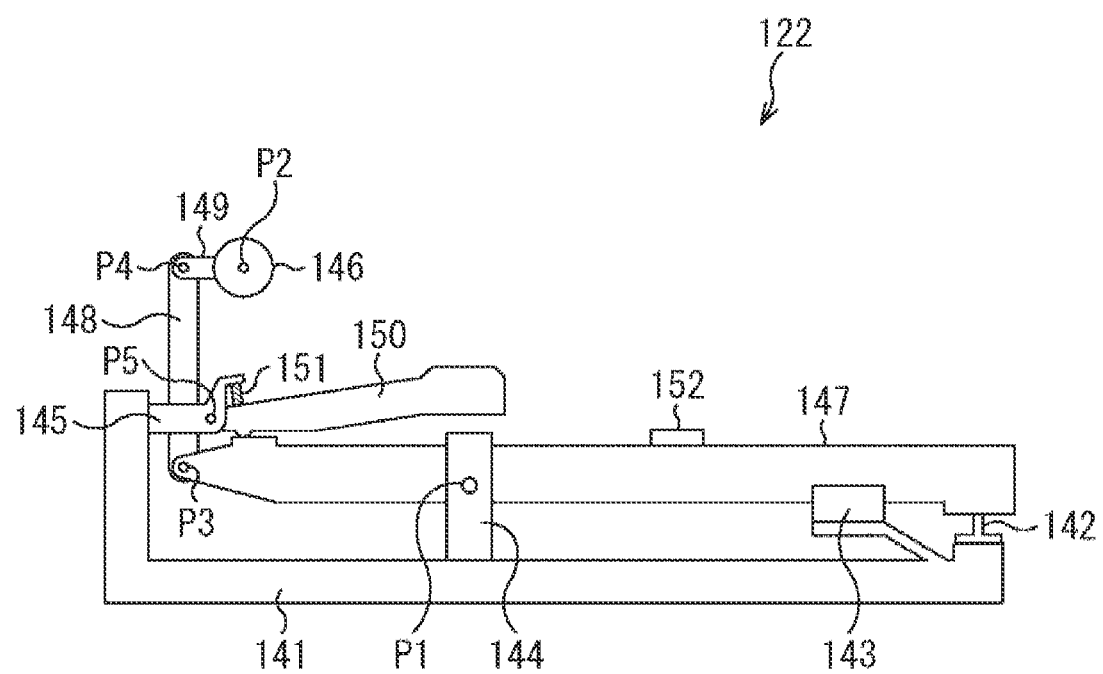
FIG. 8 is a side view schematically showing a structure of a haptic presentation unit.

The housing 121 is configured so that the haptic presentation units 122A to 122H are incorporated side by side. For example, an actuator 146, a hammer mechanism 150, and the like as shown in FIG. 8 described later are housed in the housing 121.

The haptic presentation units 122A to 122H are each configured so as to be able to change independently presented haptic sensations. Note that the detailed configuration of the haptic presentation unit 122 will be described later with reference to FIG. 8.

The information processing device 113 can be, for example, a personal computer, and includes an input unit 131 such as a keyboard and a touch pad, and a display unit 132 such as a liquid crystal panel.

In the performance skill improvement system 111 configured as described above, for example, the haptic sensation presented by the haptic presentation device 112 can be set using the information processing device 113. Then, the user can evaluate or train the haptic sensation while depressing the haptic presentation units 122A to 122H simultaneously with a plurality of fingers or continuously with a plurality of fingers.

FIG. 8 is a side view schematically showing the structure of the haptic presentation unit 122.

For example, the haptic presentation unit 122 includes a frame body 141, a stopper 142, a position sensor 143, a keyboard support member 144, a hammer support member 145, an actuator 146, a keyboard 147, a slide member 148, a torque output member 149, a hammer mechanism 150, a compression spring 151, and a force sensor 152. Then, in the haptic presentation unit 122, the frame body 141, the keyboard 147, the slide member 148, and the torque output member 149 constitute a four-node link mechanism.

The stopper 142, the position sensor 143, the keyboard support member 144, the hammer support member 145, and the actuator 146 are fixed to the frame body 141, and serves as a base for supporting a movable portion of the haptic presentation unit 122.

The stopper 142 suppresses horizontal backlash from occurring in the keyboard 147 by a pin portion inserted into a hole provided on the lower surface in the tip vicinity of the keyboard 147, and defines a terminal end when the keyboard 147 is depressed by being abutted with the lower surface of the keyboard 147.

The position sensor 143 measures a position when the keyboard 147 is depressed.

The keyboard support member 144 rotatably supports the center vicinity of the keyboard 147 with a point P1 as a coupling shaft.

The hammer support member 145 rotatably supports the rear end vicinity of the hammer mechanism 150 with a point P5 as a coupling shaft.

The actuator 146 is a motor that drives about a point P2 as the center of the rotary shaft, and transmits a rotational force to the torque output member 149 fixed to the rotary shaft. Note that, as the actuator 146, a force controllable solenoid, a voice coil motor, or the like may be employed.

The keyboard 147 is formed so that the user can depress the upper surface of the tip portion similarly to the keyboard of the piano, for example, and when the user depresses the keyboard 147 with the fingertip, a predetermined haptic sensation can be presented to the fingertip.

The slide member 148 has the lower end vicinity coupled to the rear end vicinity of the keyboard 147 with a point P3 as a coupling shaft, and the upper end vicinity coupled to the tip vicinity of the torque output member 149 as a point P4 as a coupling shaft, and slides in the vertical direction according to the drive of the actuator 146.

The torque output member 149 has the tip vicinity coupled to the upper end vicinity of the slide member 148 with the point P4 as a coupling shaft, and transmits the rotational force of the actuator 146 as a force for vertically moving the slide member 148.

The hammer mechanism 150 has the rear end vicinity coupled to the hammer support member 145 with the point P5 as a coupling shaft, and a protrusion portion is provided on the lower surface of the hammer mechanism 150 so as to abut on the upper surface of the rear end portion of the keyboard 147. Then, the hammer mechanism 150 generates a force that pushes downward the rear end portion of the keyboard 147 by the weight of the hammer mechanism 150 with the point P5 as a fulcrum.

The compression spring 151 is fixed between the hammer support member 145 and the hammer mechanism 150 in a compressed state, and generates a force that pushes downward the rear end portion of the keyboard 147 via the hammer mechanism 150.

The force sensor 152 is attached to the upper surface of the keyboard 147 in the vicinity of a place to be depressed by the user, and measures the force applied when the keyboard 147 is depressed.

The thus configured haptic presentation unit 122 can present haptic sensation to the fingertips of the user who depresses the keyboard 147 by transmitting the torque of the actuator 146 by a four-node link mechanism having the points P1 and P2 as fixed ends and the points P3 and P4 as free ends. Then, the haptic presentation unit 122 can measure the depressing operation of the user by the position sensor 143 and the force sensor 152.

For example, the operation of the haptic presentation unit 122 when the user depresses the tip vicinity of the keyboard 147 will be described with reference to FIG. 9.

On the upper side of FIG. 9, the haptic presentation unit 122 is shown in a state where no force is applied to the keyboard 147. Note that in the haptic presentation unit 122, the keyboard 147 is depressed by a stopper (not illustrated) so that the keyboard 147 is horizontal in this state.

On the lower side of FIG. 9, the haptic presentation unit 122 is shown in a state in which a force is applied so that the user depresses the tip end portion of the keyboard 147.

At this time, the haptic presentation unit 122 applies a force that pushes up the tip end portion of the keyboard 147 to the fingertip of the user by the weight and inertia transmitted to the keyboard 147 by the hammer mechanism 150 and the spring force of the compression spring 151 transmitted to the keyboard 147 via the hammer mechanism 150. Moreover, the haptic presentation unit 122 applies, to the fingertip of the user, the force transmitted to the tip end portion of the keyboard 147 by the four-node link mechanism by the actuator 146 outputting a rotational force.

Such operation enables the haptic presentation unit 122 to present haptic sensation to the fingertip of the user depressing the tip end vicinity of the keyboard 147.

Note that by adjusting three parameters of the weight and moment of inertia of the hammer mechanism 150 and the spring constant of the compression spring 151, the haptic presentation unit 122 can be configured to be settable of a default force required to depress the keyboard 147 in a state where no current is supplied to the actuator 146. That is, the default force is proportional to the weight and moment of inertia of the hammer mechanism 150 and the depth at which the keyboard 147 is depressed. Then, the haptic presentation unit 122 can reduce the load on the actuator 146 by adjusting in advance the default force to be the center vicinity of the setting range of the force required to depress the keyboard 147 when performing measurement or training. Note that by including a screw mechanism for adjusting these three parameters, the haptic presentation unit 122 can easily adjust the default force by using this screw mechanism. For example, it is possible to adjust the distance between the coupling shaft and the protrusion portion of the hammer mechanism 150, and it is possible to adjust the degree of compression or the like of the compression spring 151.

Furthermore, by employing the four-node link mechanism to transmit the force generated by the actuator 146, the haptic presentation unit 122 can generate a force that moves the tip end portion of the keyboard 147 in both the up and down directions. Therefore, for example, by supplying an alternate-current component as a current for driving the actuator 146, the tip end portion of the keyboard 147 can be vibrated in the vertical direction. Furthermore, by adjusting the length of each link configuring the four-node link mechanism, it is possible to adjust the setting range of the force required to depress the keyboard 147.

Note that in the haptic presentation unit 122, in order to transmit the force generated by the actuator 146, traction by a wire, for example, may be used, in addition to adoption of a four-node link mechanism.

Variations of the arrangement position of the actuator 146 in the haptic presentation unit 122 will be described with reference to FIG. 10.

For example, the arrangement of the actuator 146 such as the haptic presentation unit 122 shown in FIG. 8 is set as a first arrangement position. Then, A of FIG. 10 shows the haptic presentation unit 122a in which the actuator 146 is arranged at a second arrangement position, and B of FIG. 10 shows the haptic presentation unit 122b in which the actuator 146 is arranged at a third arrangement position.

Figure 10:
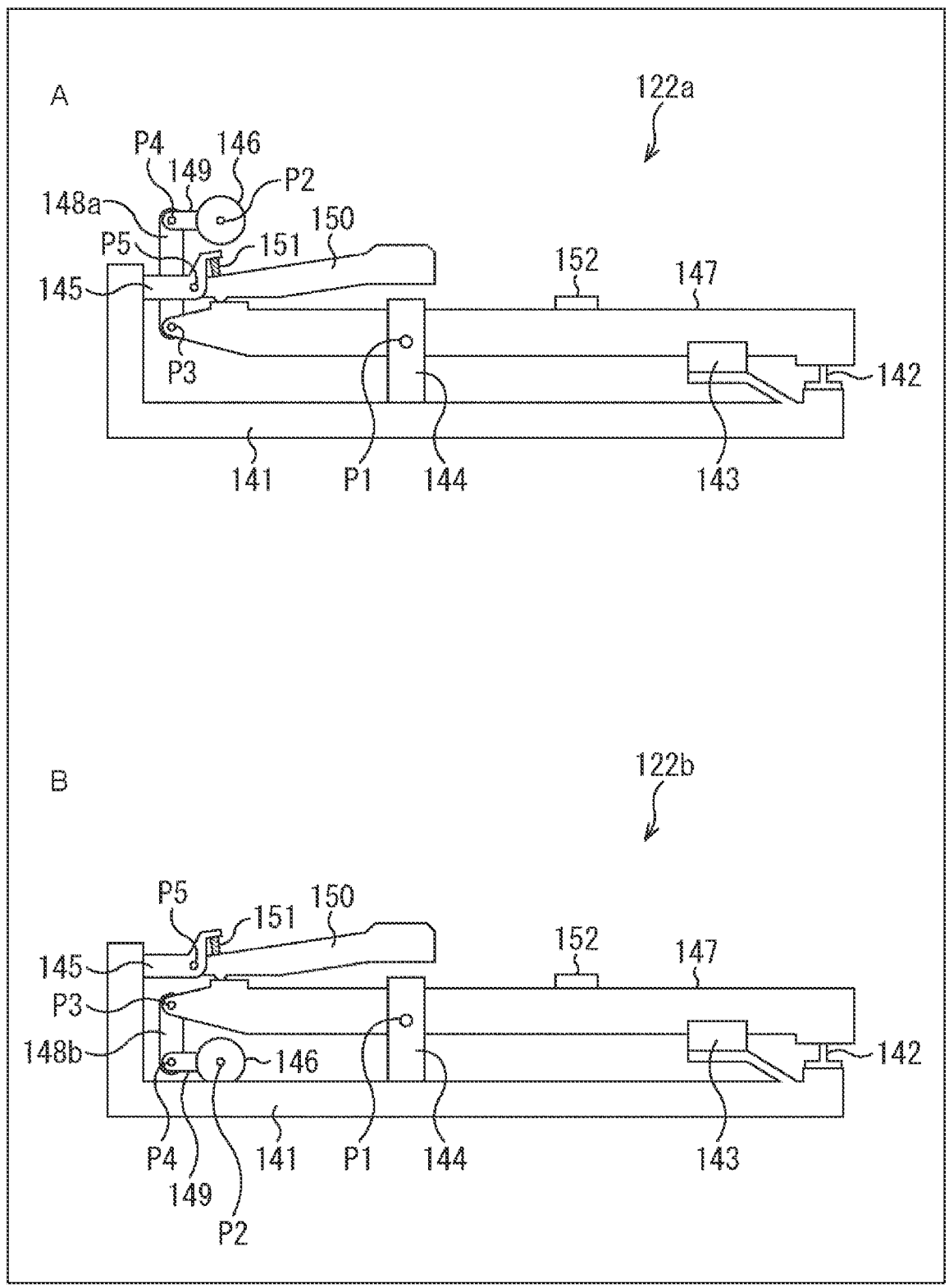
FIG. 10 is a view showing a variation of a placement position of an actuator.

As shown in A of FIG. 10, in the haptic presentation unit 122a, the actuator 146 is arranged at the second arrangement position above the keyboard 147 and lower than the first arrangement position of the actuator 146 of the haptic presentation unit 122 of FIG. 8. For example, a slide member 148a constituting the haptic presentation unit 122a is designed to be shorter in length than the slide member 148 of the haptic presentation unit 122 shown in FIG. 8.

As shown in B of FIG. 10, in the haptic presentation unit 122b, the actuator 146 is arranged at the third arrangement position below the keyboard 147. For example, the slide member 148b constituting the haptic presentation unit 122b is configured to be coupled to the torque output member 149 of the actuator 146 arranged below the keyboard 147.

Thus, by designing three variations of the arrangement positions of the actuator 146 in the haptic presentation unit 122, it is possible to prevent the arrangement positions of the actuators 146 from overlapping between, for example, the adjacent haptic presentation units 122. That is, as shown in FIG. 7, even in the haptic presentation unit 122 in which the haptic presentation units 122A to 122H are continuously arranged so as to be adjacent to each other, each portion constituting the haptic presentation units 122A to 122H can be housed in the housing 121.

Figure 11:
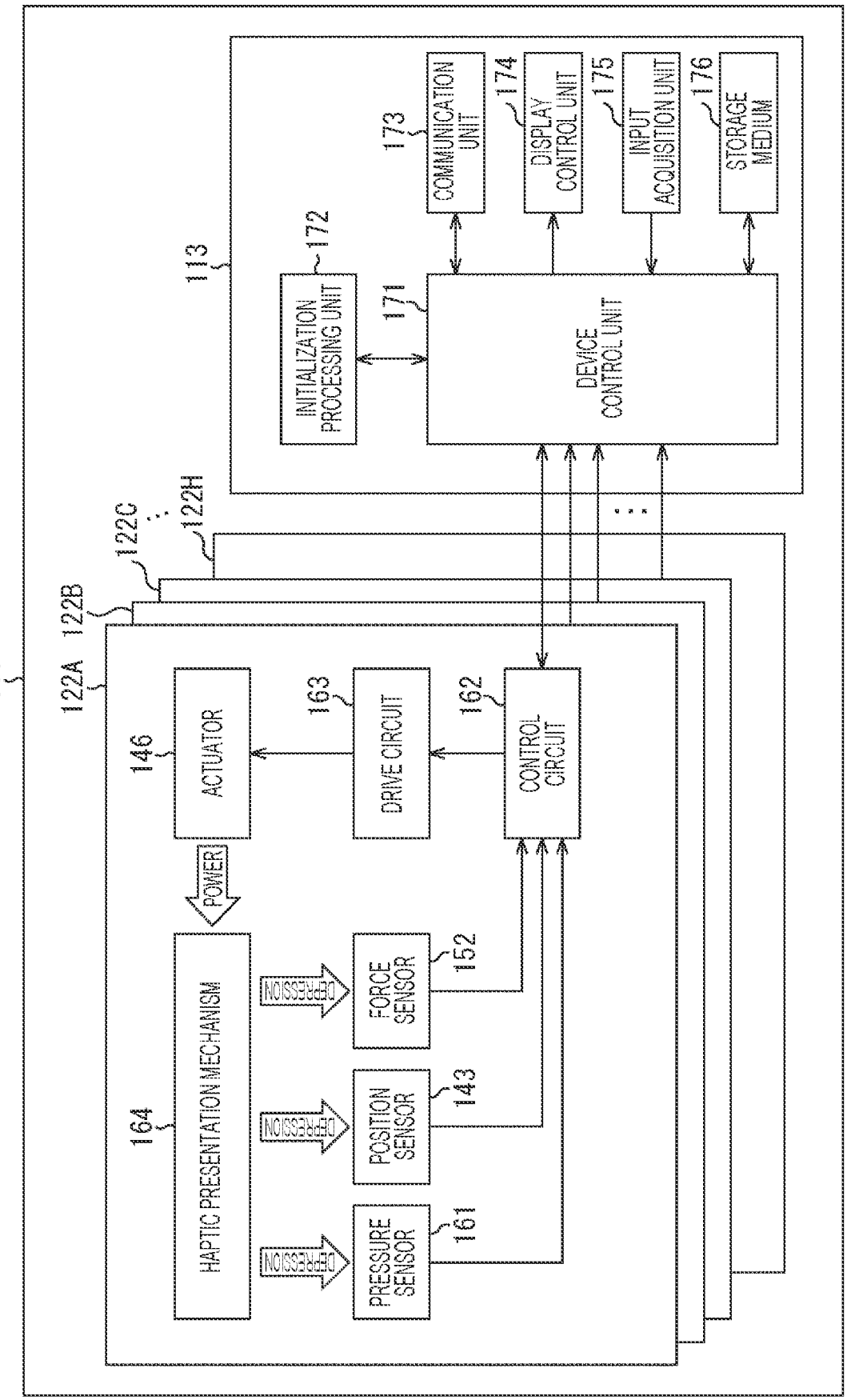
FIG. 11 is a block diagram showing a functional configuration example of the performance skill improvement system.

FIG. 11 is a block diagram showing a functional configuration example of the performance skill improvement system 111.

For example, in the performance skill improvement system 111, the haptic presentation units 122A to 122H are configured to be each connected to the information processing device 113 via a signal line.

The haptic presentation unit 122 includes, in addition to the position sensor 143, the actuator 146, and the force sensor 152 as shown in FIG. 8, a pressure sensor 161, a control circuit 162, a drive circuit 163, and a haptic presentation mechanism 164.

The force sensor 152 measures the force applied to the keyboard 147 when the keyboard 147 is depressed by the user, and supplies force data indicating the force to the control circuit 162.

The position sensor 143 measures the position of the keyboard 147 when the keyboard 147 is depressed by the user, and supplies position data indicating the position to the control circuit 162.

The pressure sensor 161 measures the pressure applied to the keyboard 147 when the keyboard 147 is depressed by the user, and supplies pressure data indicating the pressure to the control circuit 162.

The control circuit 162 recognizes the depressing operation on the keyboard 147 on the basis of the force data, the position data, and the pressure data. Furthermore, the control circuit 162 controls the drive circuit 163 so as to present a haptic sensation corresponding to the setting input by the user by using the information processing device 113.

The drive circuit 163 supplies electric power according to control by the control circuit 162 to the actuator 146 to drive the actuator 146.

The haptic presentation mechanism 164 is a mechanism that presents haptic sensation to the user by transmitting the rotational force output from the actuator 146 by the four-node link mechanism as described above with reference to FIG. 8 to the tip end portion of the keyboard 147, which is the depressing portion by the user.

The information processing device 113 includes a device control unit 171, an initialization processing unit 172, a communication unit 173, a display control unit 174, an input acquisition unit 175, and a storage medium 176.

The device control unit 171 includes a CPU, a ROM, a RAM, and the like, and executes a program for performing various processing described later.

The initialization processing unit 172 performs initialization processing for the haptic presentation units 122A to 122H to associate torque output from each actuator 146 with force measured by the force sensor 152.

Figure 35:
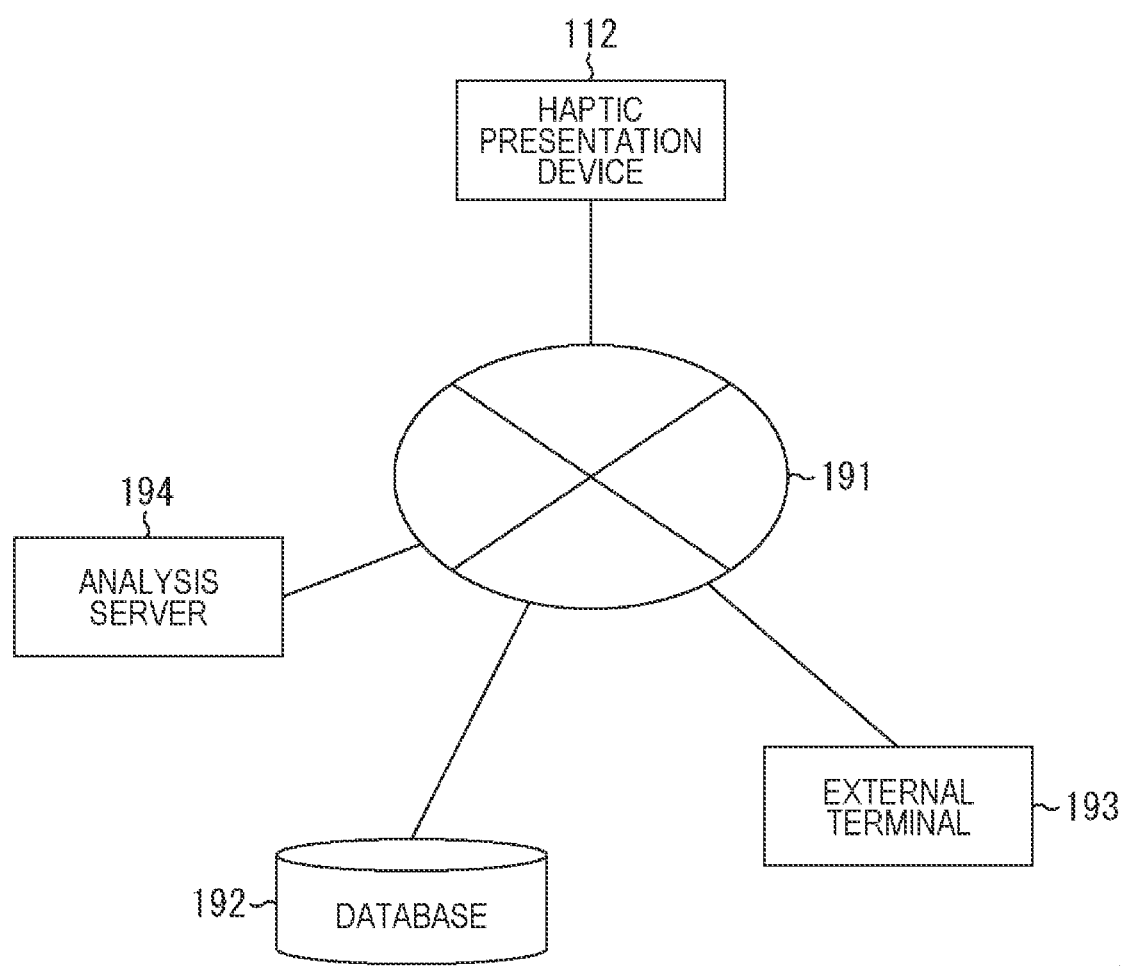
FIG. 35 is a view explaining a usage example of a haptic presentation device via a network.

The communication unit 173 communicates by wired communication or wireless communication with a database 192 and an external terminal 193 as shown in FIG. 35 described later.

The display control unit 174 performs display control to display various screens (for example, the main control screen or the like shown in FIG. 12) on the display unit 132 shown in FIG. 1 according to control by the device control unit 171.

The input acquisition unit 175 acquires, for example, various set values and information input by the user's operation with the input unit 131 shown in FIG. 1, and supplies them to the device control unit 171.

The storage medium 176 stores information necessary for processing performed by the performance skill improvement system 111, measurement results (scores) measured by the performance skill improvement system 111, and the like.

The performance skill improvement system 111 configured as described above can accurately evaluate the haptic function of the fingers of a performer or a rehabilitation patient, for example, and perform haptic training. Furthermore, the performance skill improvement system 111 can independently perform evaluation or training of the haptic sensation and the motor sense.

Figure 12:
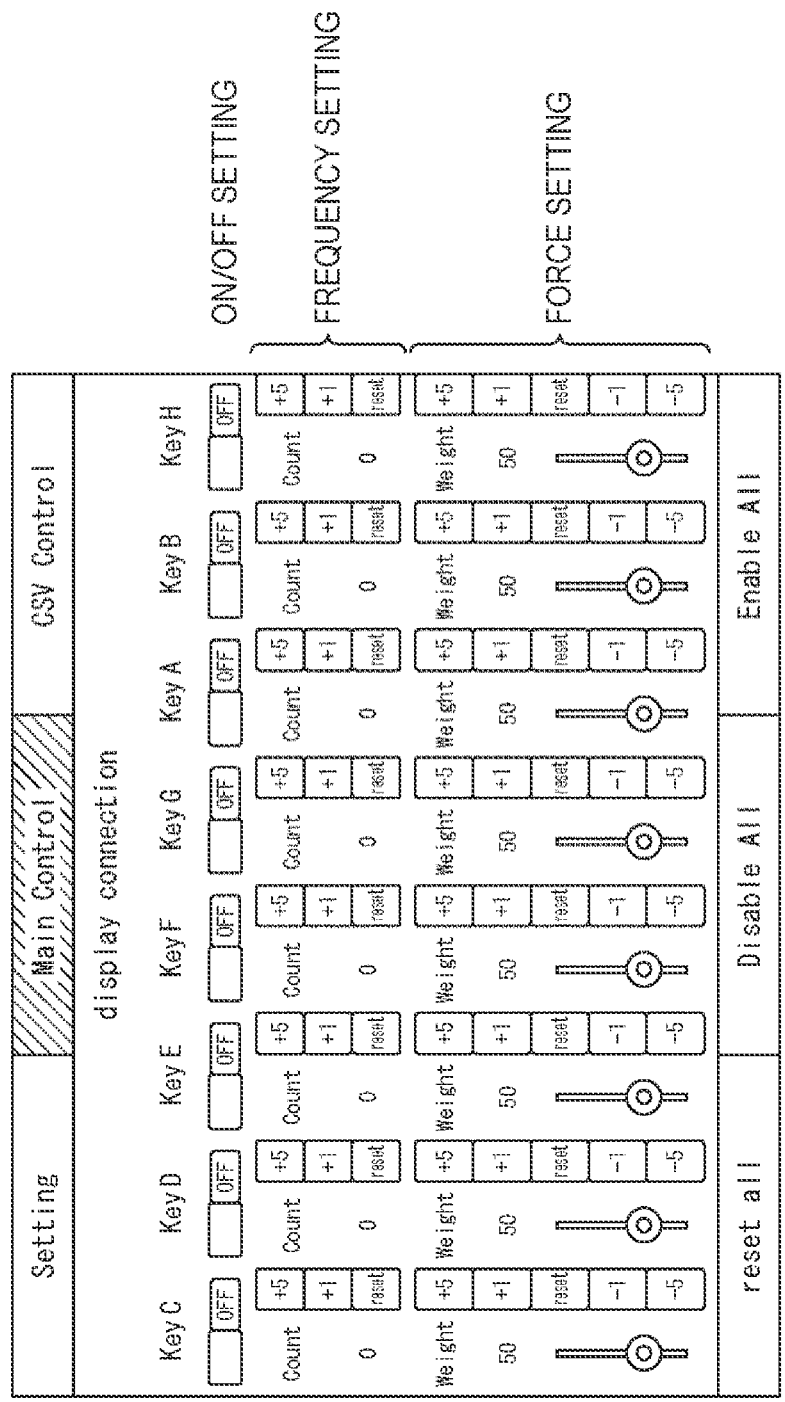
FIG. 12 is a view showing a display example of a main control screen.

FIG. 12 shows a display example of the main control screen displayed on the display unit 132 of the information processing device 113.

The main control screen shown in FIG. 12 displays, for each of the haptic presentation units 122A to 122H, a graphical user interface (GUI) for inputting settings using an on/off setting unit, a frequency setting unit, and a force setting unit in order from the top in the vertical direction.

For example, Key C displayed on the left end of the main control screen indicates that a GUI performing setting for the haptic presentation unit 122C is displayed, and Key D displayed next to Key C indicates that a GUI performing setting for the haptic presentation unit 122D is displayed. Similarly, GUIs performing setting for other haptic presentation units 122 are displayed.

The on/off setting unit is a GUI of a button for setting on/off of the presentation of the haptic sensation by each of the haptic presentation units 122A to 122H.

The frequency setting unit is a GUI of a button for inputting a set value of the number of times of depressing in each of the haptic presentation units 122A to 122H.

The force setting unit is a GUI of a button and a sequence bar for inputting the magnitude of the force presented in each of the haptic presentation units 122A to 122H. For example, the force presented when the current supplied to the actuator 146 is zero is set as a default force.

Note that when the keyboard 147 is depressed, the haptic presentation unit 122 controls the drive of the actuator 146 so that a constant force is always generated regardless of the depth at which the keyboard 147 is depressed, or may control the drive of the actuator 146 so that a force that changes in accordance with, for example, the depth at which the keyboard 147 is depressed is generated.

Figure 13:
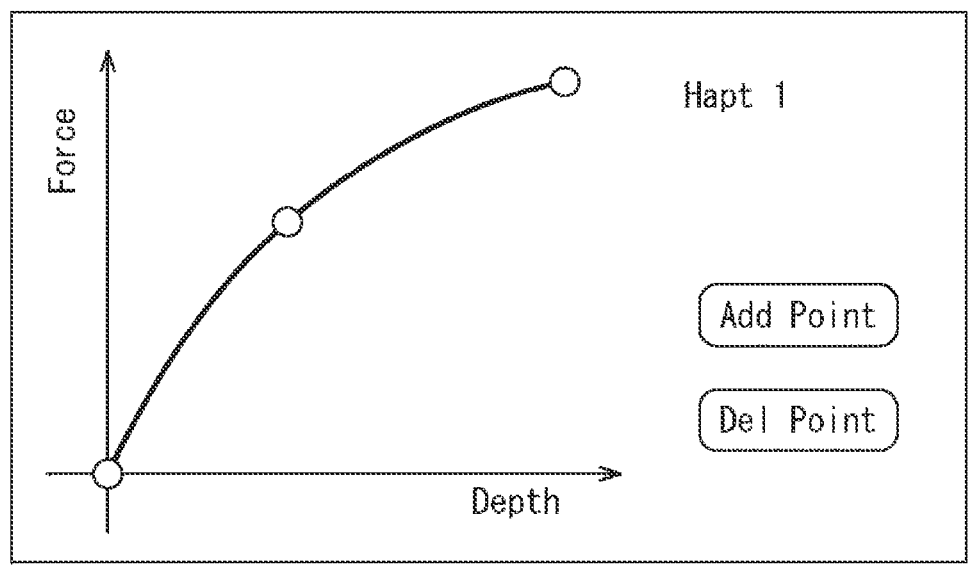
FIG. 13 is a view showing an example of a control curve of controlling force according to a depth.

For example, FIG. 13 shows an example of a control curve for controlling the force generated by the actuator 146 in accordance with the depth at which the keyboard 147 is depressed. That is, when the user adjusts the position of a control point indicated by an outline circle in FIG. 13 or performs input such as adding or deleting a control point, the drive of the actuator 146 is controlled so as to generate a force according to the control curve.

Figure 14:
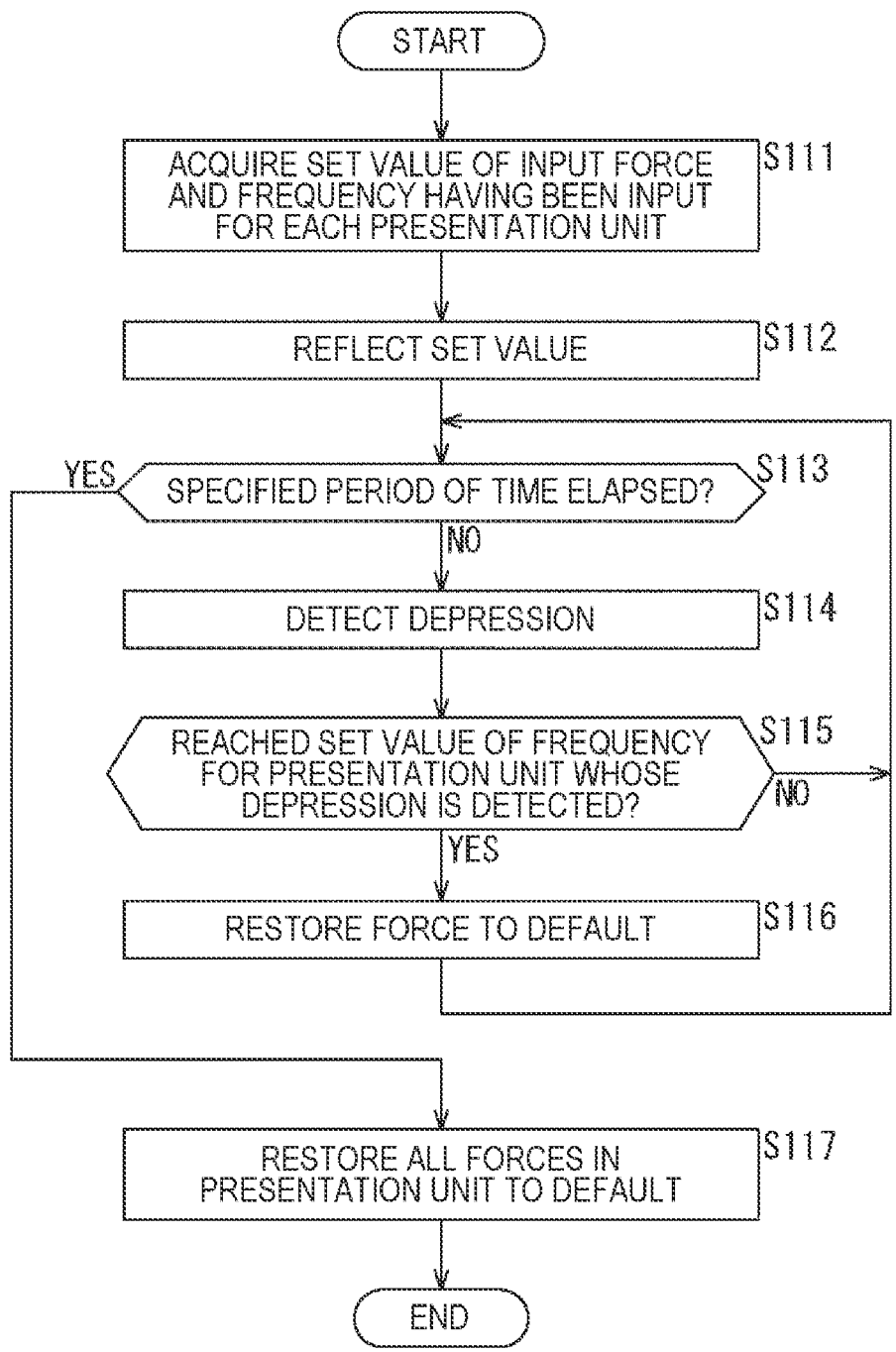
FIG. 14 is a flowchart explaining actuator control processing.

Actuator control processing that controls the actuator 146 in the performance skill improvement system 111 will be described with reference to the flowchart shown in FIG. 14.

In step S111, the performance skill improvement system 111 sets the force and the frequency for the individual haptic presentation units 122A to 122H. For example, the device control unit 171 controls the display control unit 174 to display, on the display unit 132, the main control screen as shown in FIG. 12. Therefore, the user can input the force and the frequency for each of the haptic presentation units 122A to 122H by using the GUI displayed on the main control screen and using the input unit 131. Then, the input acquisition unit 175 acquires the set values of the force and the frequency input to the individual haptic presentation units 122A to 122H, and supplies them to the device control unit 171.

In step S112, the device control unit 171 supplies the set values of the force and the frequency acquired in step S111 to the control circuit 162 of the corresponding haptic presentation units 122A to 122H, respectively, to reflect the set values of the force and the frequency. Thus, in the haptic presentation units 122A to 122H, each control circuit 162 controls the drive circuit 163 so as to generate a force according to the set value. Then, the drive circuit 163 starts supplying the current to the actuator 146 according to the control by the control circuit 162.

In step S113, the device control unit 171 determines whether or not a predetermined specified time has elapsed since the supply of the current to the actuator 146 is started in step S112. For example, the specified time is set to a time at which overheating of the actuator 146 can be prevented.

In a case where the device control unit 171 determines in step S113 that the specified time has not elapsed, the processing proceeds to step S114.

In step S114, the control circuit 162 of each of the haptic presentation units 122A to 122H detects depression of the keyboard 147 on the basis of the position data supplied from the position sensor 143. Then, the control circuits 162 of the haptic presentation units 122A to 122H, having detected the depression of the keyboard 147, increment the number of times of depression of the keyboard 147.

In step S115, the control circuits 162 of each of the haptic presentation units 122A to 122H determines whether or not the current frequency of depressions in accordance with the detection result in step S114 has reached the set value of the frequency of depressions set in step S111.

In a case where the control circuit 162 of any of the haptic presentation units 122A to 122H determines in step S115 that the frequency of depressions has reached the set value, the processing proceeds to step S116.

In step 3116, the control circuit 162, having determined that the frequency of depressing has reached the set value in step S115, controls the drive circuit 163 so that the current supplied to the actuator 146 becomes zero. Accordingly, the drive circuit 163 stops supplying current to the actuator 146, and the force required to depress the keyboard 147 returns to the default state. Note that in the control circuit 162 that determines in step 3115 that the frequency of depressions has not reached the set value, the processing in step S116 is skipped.

In a case where the control circuit 162 of any of the haptic presentation units 122A to 122H determines after the processing of step S116 or in step S115 that the frequency of depressions has not reached the set value, the processing returns to step S113, and the similar processing is repeated thereafter.

Then, in a case where the device control unit 171 determines in step S113 that the specified time has elapsed, the processing proceeds to step S117.

In step S117, the device control unit 171 returns the force required to depress the keyboard 147 to the default state for all of the haptic presentation units 122A to 122H. That is, the device control unit 171 instructs the control circuit 162 of the haptic presentation unit 122 among the haptic presentation units 122A to 122H whose frequency of depressions has not reached the set value in step S115 to return the force to the default state. The control circuit 162 having received this instruction controls the drive circuit 163 so that the current supplied to the actuator 146 becomes zero. As a result, the supply of the current to all the actuators 146 of the haptic presentation units 122A to 122H is stopped, and the actuator control processing ends.

As described above, the performance skill improvement system 111 can prevent the actuator 146 from overheating by performing protection control so that the current supplied to the actuator 146 is made zero when the frequency of depressions of the keyboard 147 reaches a set value of the frequency. Similarly, the performance skill improvement system 111 can prevent the actuator 146 from overheating by performing protection control so that the current supplied to the actuator 146 is made zero also when the specified time has elapsed after the supply of the current to the actuator 146 is started.

Figure 15:
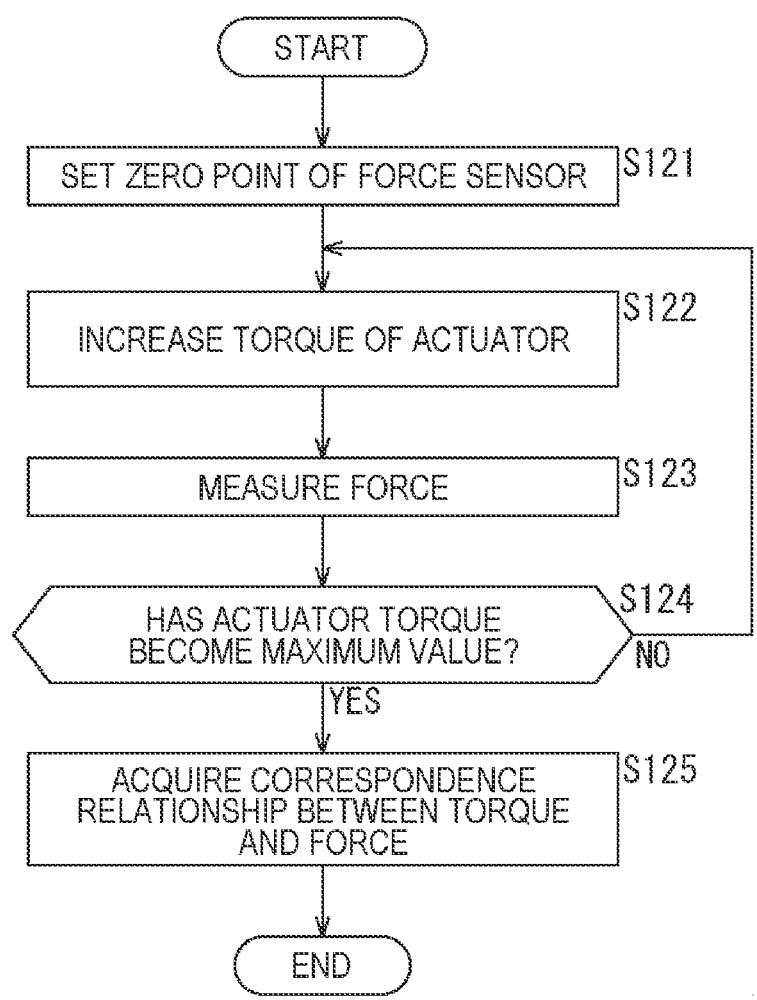
FIG. 15 is a flowchart explaining initialization processing of initializing an output of a force sensor.

The initialization processing for initializing the output of the force sensor 152 will be described with reference to the flowchart of FIG. 15. Note that the initialization processing can be individually performed in each of the haptic presentation units 122A to 122H.

In step S121, the control circuit 162 sets the output value of the force data output from the force sensor 152 as a zero point in a state where the torque of the actuator 146 is not output (torque=0).

In step S122, the control circuit 162 controls the drive circuit 163 so that the torque output from the actuator 146 increases by a predetermined increase width, and the drive circuit 163 increases the current supplied to the actuator 146.

In step S123, the force sensor 152 measures the force applied to the keyboard 147 and supplies force data of the current torque to the control circuit 162.

In step S124, the control circuit 162 determines whether or not the torque output from the actuator 146 has reached the maximum value.

In a case where the control circuit 162 determines in step S124 that the torque has not reached the maximum value, the processing returns to step S122 to increase the torque, and the similar processing is repeated thereafter. On the other hand, in a case where the control circuit 162 determines in step S124 that the torque has reached the maximum value, the processing proceeds to step S125.

In step S125, the control circuit 162 supplies, to the device control unit 171, the force data in each torque supplied from the force sensor 152 during the period from the state where the torque is not output to the state where the torque becomes the maximum value. Then, the device control unit 171 creates a correspondence map showing the correspondence relationship between the torque and the force as shown in FIG. 16 and stores it in the storage medium 176, and then the initialization processing is ended.

As described above, the performance skill improvement system 111 can acquire the correspondence relationship between the current supplied to the actuator 146 and the force applied to the keyboard 147. By acquiring such correspondence relationship for each environment where the performance skill improvement system 111 is used, for example, haptic sensation can be presented with higher accuracy regardless of, for example, the external temperature, the state of the haptic presentation device 112, and the like.

Figures 16, 17:
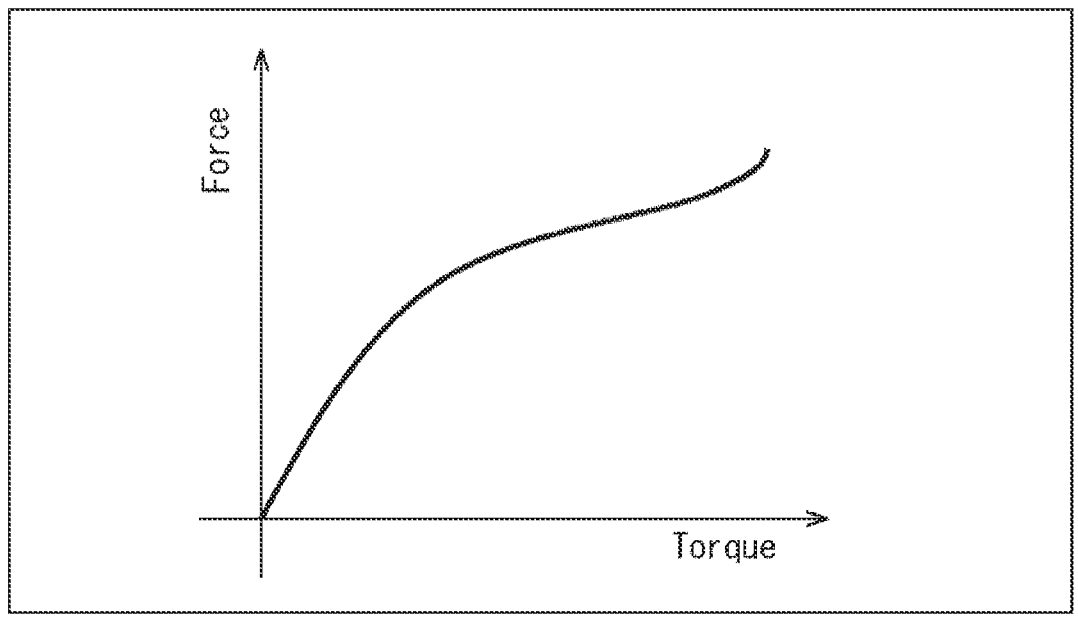
FIG. 16 is a view showing an example of a correspondence map of torque and force.
FIG. 17 is a view showing an example of a haptic sensation list.

FIG. 17 shows an example of a haptic sensation list used in evaluation processing described later with reference to FIG. 18 and training processing described later with reference to FIG. 19.

As illustrated, in the haptic sensation list, command values for instructing the magnitude of the force to be presented for each depression frequency are registered individually for the haptic presentation units 122A to 122H. Furthermore, in the haptic sensation list, the command value is set so that the force presented by the predetermined number (one or more) of haptic presentation units 122 differs from the force presented by other haptic presentation units 122. For example, the command value may be set such that the force presented by the predetermined number of haptic presentation units 122 becomes larger than the force presented by the other haptic presentation units 122, or the command value may be set such that it becomes smaller. Furthermore, the command value may be set so that the force presented by another haptic presentation unit 122 may be in a default state (the current supplied to the actuator 146 is 0), or it becomes smaller or larger than the default.

The evaluation processing of evaluating the haptic sensation in the performance skill improvement system 111 will be described with reference to the flowchart shown in FIG. 18.

In step S131, the device control unit 171 performs the initialization processing described with reference to the flowchart of FIG. 15, and reads the haptic sensation list as shown in FIG. 17 from the storage medium 176. Then, in accordance with the haptic sensation list, the device control unit 171 sets the command value registered for each row of the frequency of depressions to the control circuit 162 of each of the corresponding haptic presentation units 122A to 122H.

In step S132, the control circuit 162 controls the drive circuit 163 so as to present a force with the magnitude of the command value associated with the current frequency of depressions, and the drive circuit 163 supplies, to the actuator 146, a current corresponding to the control by the control circuit 162. Thus, the individual haptic presentation units 122A to 122H can present haptic sensation so that the force required to depress the keyboard 147 has a magnitude corresponding to each command value.

In step S133, the device control unit 171 instructs the user to depress the keyboard 147. For example, the device control unit 171 controls the display control unit 174 to designate the user's finger that depresses each keyboard 147A to 147H, and displays, on the display unit 132, an image instructing the order, rhythm, and tempo of depressing the fingers. For example, the device control unit 171 can instruct a plurality of fingers to simultaneously depress the keyboard 147. Note that the rhythm and tempo may be instructed by a sound output from a speaker (not illustrated) or the like.

After depressing the keyboard 147 with a designated finger in accordance with the depressing instruction in step S133, the user can use the input unit 131 to input a response indicating the force required to depress which keyboard 147 with which finger was larger (smaller) than the force required to depress the other keyboard 147. That is, among the haptic presentation units 122A to 122H, the force presented by the predetermined number of haptic presentation units 122 is controlled to be larger (or smaller) than the force presented by the other haptic presentation units 122. Therefore, the user is only required to response the finger that depressed the keyboard 147 of the haptic presentation unit 122 that the use felt that the force required to depress the keyboard 147 was large (or small).

In step S134, the device control unit 171 acquires the response input by the user via the input acquisition unit 175.

In step S135, the device control unit 171 determines whether or not the evaluation has been repeated as many times as the number of rows in the haptic sensation list read in step S131. For example, in a case where the force has been presented with the magnitude of the command value associated with all the numbers of times registered in the haptic sensation list, the device control unit 171 can determine that the evaluation has been repeated as many times as the number of rows in the haptic sensation list.

In a case where the device control unit 171 determines in step S135 that the evaluation has not been repeated as many times as the number of rows in the haptic sensation list, the processing returns to step S132, and the similar processing is repeated thereafter, targeting the haptic sensation registered in the frequency of depressions of the next row registered in the haptic sensation list. On the other hand, in a case where the device control unit 171 determines in step S135 that the evaluation has been repeated as many times as the number of rows in the haptic sensation list, the processing proceeds to step S136.

In step S136, the device control unit 171 obtains a fitting curve (see FIG. 3) for each finger of the user on the basis of whether or not the response acquired in step S134 is correct. For example, the response is correct in a case where the user's finger used to input has been instructed to depress the keyboard 147 of the predetermined number of the haptic presentation units 122 controlled to present a larger (or smaller) force than the others. Then, the device control unit 171 calculates the load weight, which is the inflection point in the fitting curve, as a threshold value, and stores the calculated load weight in the storage medium 176, and then the evaluation processing is ended.

As described above, the performance skill improvement system 111 can evaluate the classification of the force required to depress the keyboard 147 for each finger of the user depending on the threshold value obtained on the basis of whether or not the user's response is correct. For example, it is assumed that the haptic sensation is reduced when the finger is moved in a complicated manner or when the adjacent finger is moved simultaneously, and it is possible to evaluate such reduction in the haptic sensation.

The training processing of training haptic sensation in the performance skill improvement system 111 will be described with reference to the flowchart shown in FIG. 19.

Figure 18:
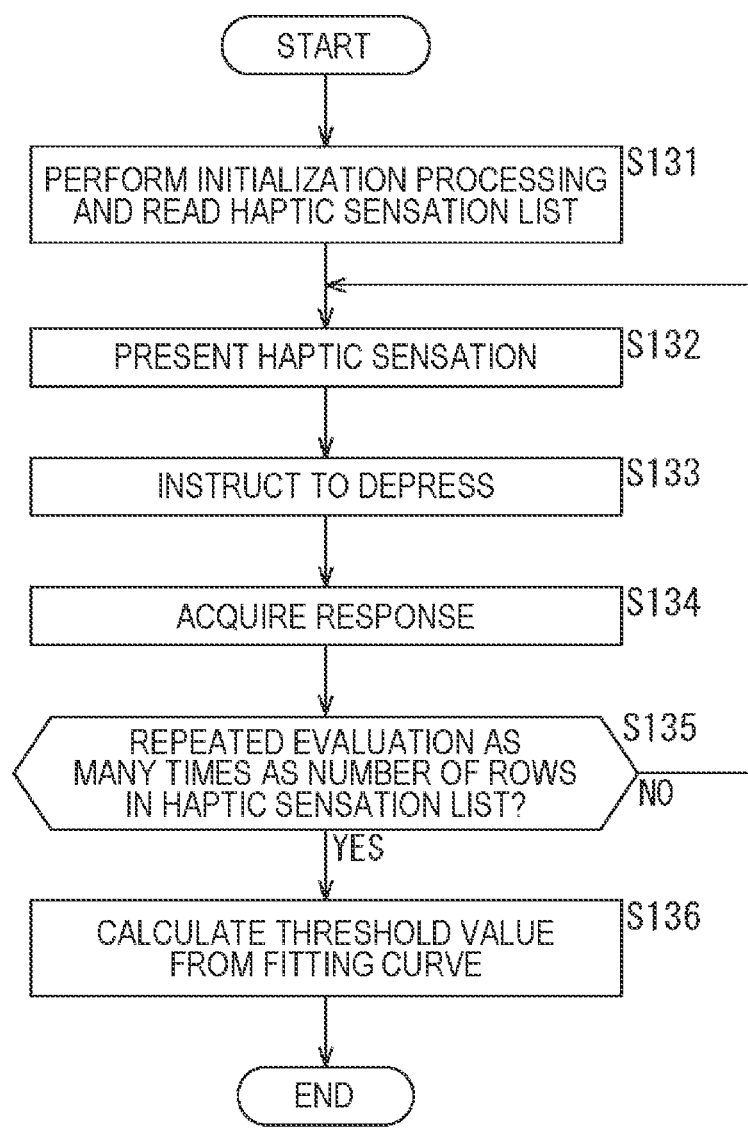
FIG. 18 is a flowchart explaining evaluation processing of evaluating a haptic sensation.
Figure 19:
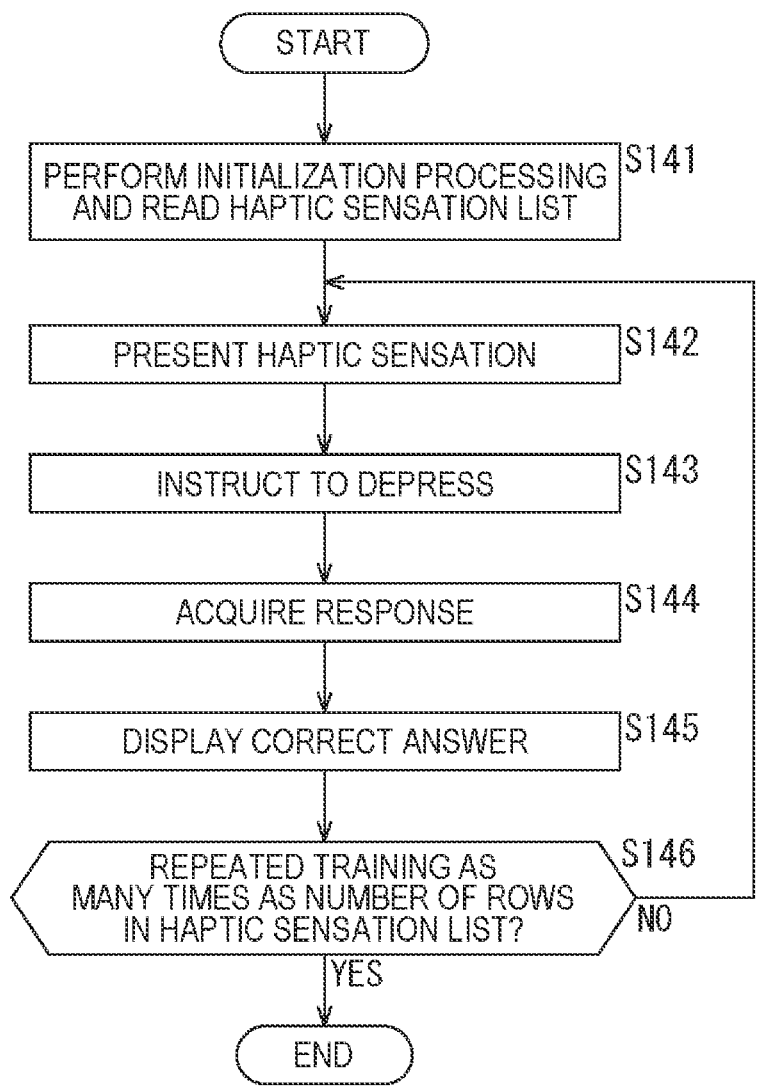
FIG. 19 is a flowchart explaining training processing of training a haptic sensation.

In steps S141 to S144, the similar processing to that in steps 3131 to S134 of FIG. 18 is performed. The user inputs a response after depressing the keyboard 147 with the designated finger according to the depressing instruction in step 3143, and the response is acquired in step S144.

In step S145, the device control unit 171 controls the display control unit 174 to cause the display unit 132 to display the haptic presentation unit 122 controlled to be larger (or smaller) than the force presented by the other haptic presentation unit 122 at this time as the correct response to the user's response.

In step S146, the device control unit 171 determines whether or not the training has been repeated as many times as the number of rows in the haptic sensation list read in step S141.

In a case where the device control unit 171 determines in step S146 that the training has not been repeated as many times as the number of rows in the haptic sensation list, the processing returns to step S142, and the similar processing is repeated for the haptic sensation registered in the frequency of depressions of the next row registered in the haptic sensation list. On the other hand, in a case where the device control unit 171 determines in step S146 that the training has been repeated as many times as the number of rows in the haptic sensation list, the training processing is ended. Note that the device control unit 171 may end the training processing at a discretionary timing of the user.

As described above, by displaying (giving feedback of) the correct response to the user's response on the display unit 132, the performance skill improvement system 111 can perform the training of classifying the force required to depress the keyboard 147 for each finger of the user. For example, it is assumed that the haptic sensation is reduced when the finger is moved in a complicated manner or when the adjacent finger is moved simultaneously, and it is possible to perform training to avoid such a reduction in the haptic sensation.

Figure 20:
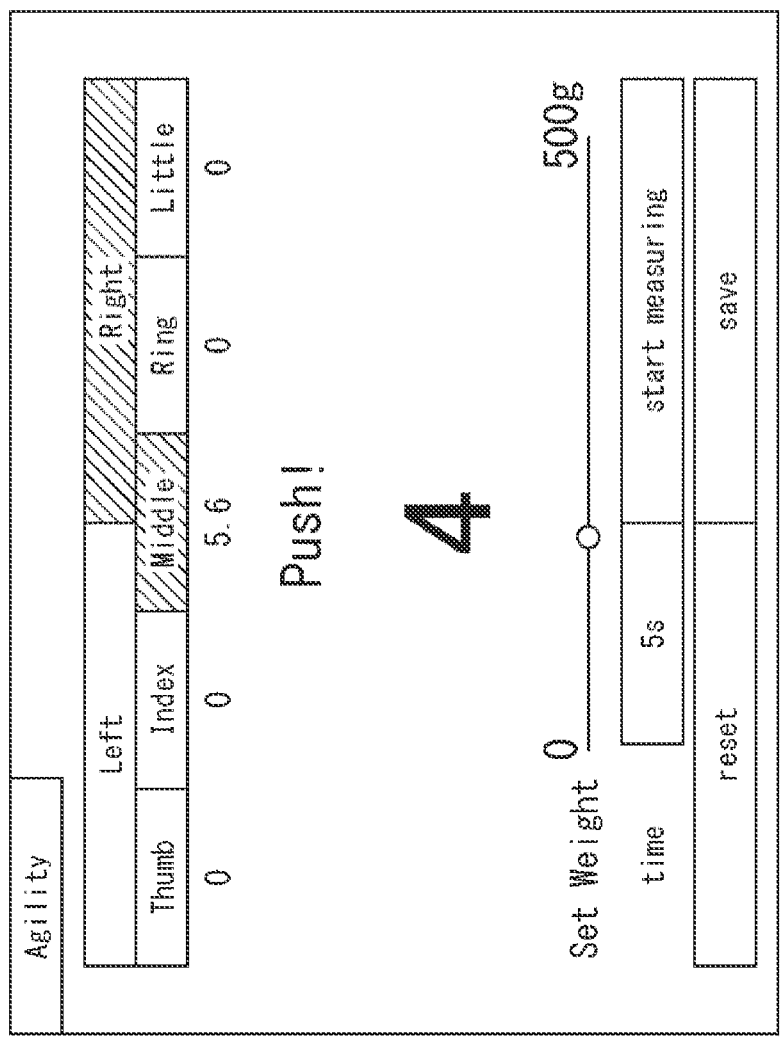
FIG. 20 is a view showing a display example of an agility measurement screen.
Figure 21:
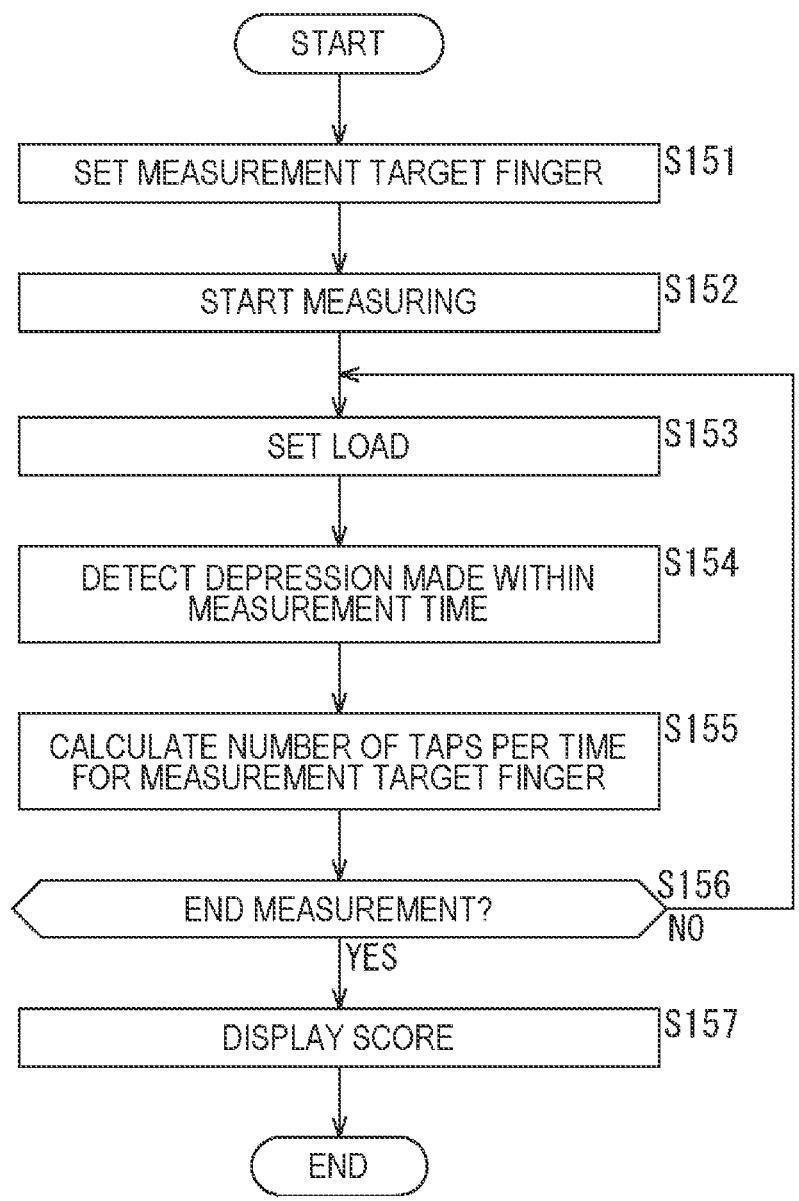
FIG. 21 is a flowchart explaining first agility evaluation processing.
Figure 23:
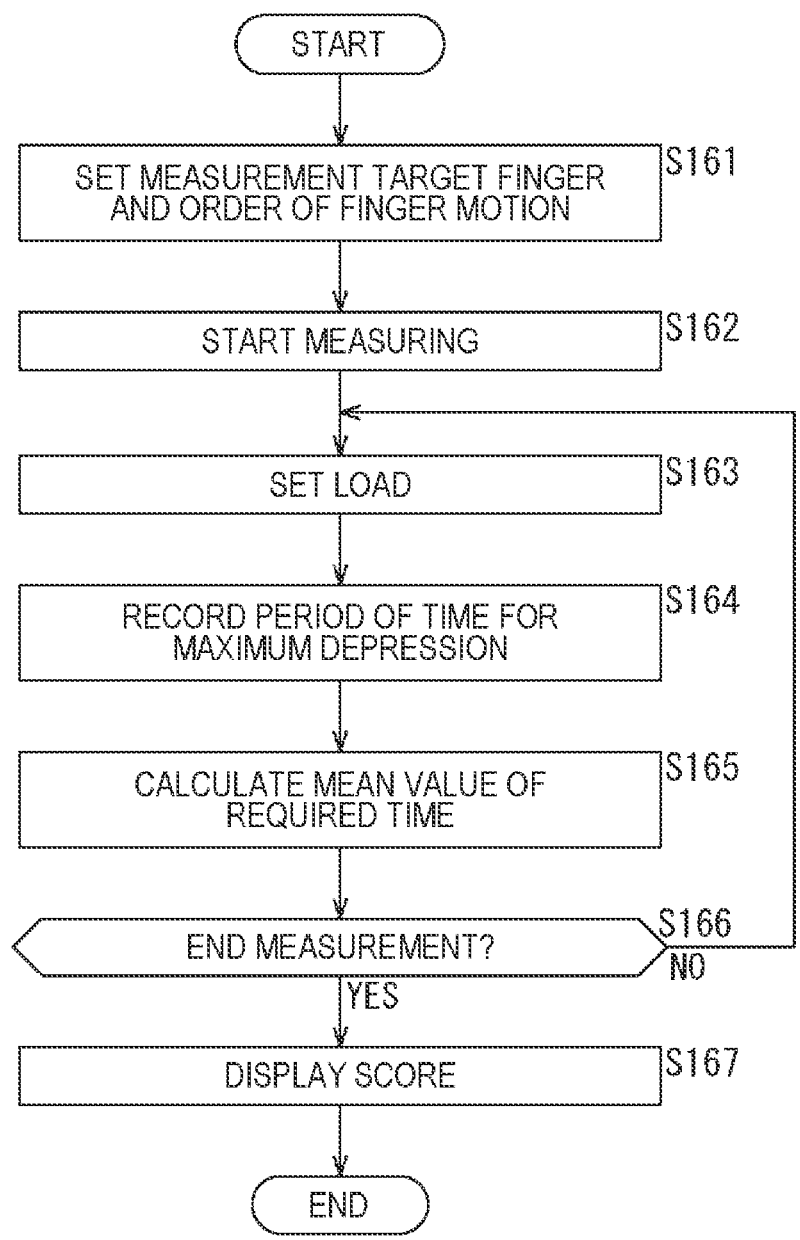
FIG. 23 is a flowchart explaining second agility evaluation processing.

FIG. 20 is a view showing a display example of an agility measurement screen displayed during measurement of agility evaluation processing explained with reference to FIGS. 21 and 23 described later.

For example, the agility measurement screen displays a GUI for selecting a finger to be measured. The example shown in FIG. 20 displays that the middle finger of the right hand has been selected as a measurement target as represented by hatching. Furthermore, the agility measurement screen displays the frequency indicating how many tasks have been carried out at the present time from among the series of tasks carried out in the agility evaluation processing, and the example shown in FIG. 20 displays the fourth time.

Moreover, the agility measurement screen displays GUIs such as a slider for setting a load required for depressing the keyboard 147, a button for setting a measurement time, a button for instructing start of the measurement time, a button for resetting the measurement result, and a button for storing the measurement result.

The first agility evaluation processing for evaluating agility in the performance skill improvement system 111 will be described with reference to the flowchart shown in FIG. 21. Note that in the first agility evaluation processing, agility in depressing with one finger or agility in depressing with a plurality of fingers simultaneously (for example, chords) is evaluated.

In step S151, in the performance skill improvement system 111, a finger to be measured (a plurality of fingers in a case of depressing simultaneously by a plurality of fingers) is set. For example, the device control unit 171 controls the display control unit 174 to cause the display unit 132 to display the agility measurement screen shown in FIG. 20. Therefore, by using the input unit 131, the user can input selection of a right hand or a left hand to the agility measurement screen, and input selection of a finger to be measured on the selected hand. Then, the input acquisition unit 175 supplies information indicating the finger selected by the user to the device control unit 171, and the device control unit 171 sets the finger indicated by the information as the measurement target.

In step S152, the performance skill improvement system 111 is ready to start measurement for evaluating agility.

In step S153, the performance skill improvement system 111 sets a load required for depressing the keyboard 147 when evaluating agility. For example, the user can set the load on the agility measurement screen of FIG. 20 by the position of the slider of Set Weight using the input unit 131. Then, the input acquisition unit 175 acquires information indicating the load set by the user, supplies the information to the control circuit 162 via the device control unit 171, and controls the drive circuit 163. That is, the device control unit 171 controls the control circuit 162 on the basis of the information. Thus, a current is supplied from the drive circuit 163 to the actuator 146 so as to generate a force that pushes down the keyboard 147 by the user applying the load to the keyboard 147.

In step S154, with the performance skill improvement system 111, the user depresses the keyboard 147 as many times as possible within a preset measurement time (5 seconds in the example shown in FIG. 20). At this time, the control circuit 162 detects the number of times of depressions of the keyboard 147 on the basis of the position data supplied from the position sensor 143, and supplies the detected number of times to the device control unit 171.

In step S155, the device control unit 171 calculates the number of taps per time for the finger set as the measurement target in step S151.

In step S156, the device control unit 171 determines whether or not to end the measurement for evaluating agility. For example, when the measurement of the finger for evaluating agility at a desired load is completed, the user can input, by using the input unit 131, an instruction to end the measurement, and the determination is performed according to this input.

In a case where the device control unit 171 determines in step S156 not to end the measurement for evaluating agility, the processing returns to step S153, and after the user sets a different load, the similar processing is repeated thereafter. On the other hand, in a case where the device control unit 171 determines in step S156 to end the measurement for evaluating agility, the processing proceeds to step S157.

Figure 22:
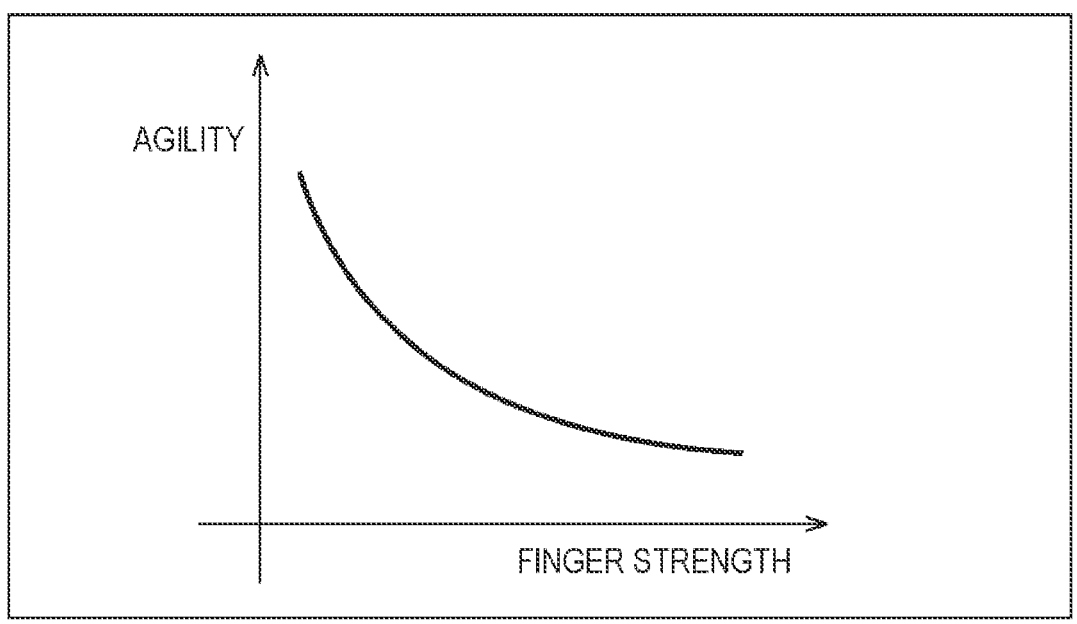
FIG. 22 is a view showing an example of a measurement result indicating a relationship between a finger strength and agility.

In step S157, the device control unit 171 acquires, as a measurement result, a curve representing the relationship between the strength of the finger having depressed the keyboard 147 and the agility of the finger, as shown in FIG. 22, with the number of taps calculated for each measured load as the agility. Then, the device control unit 171 controls the display control unit 174 to cause the display unit 132 to display the curve as a score representing agility, and then the first agility evaluation processing is ended.

The second agility evaluation processing for evaluating agility in the performance skill improvement system 111 will be described with reference to the flowchart shown in FIG. 23. Note that, in the second agility evaluation processing, agility at the time of continuously depressing with a plurality of fingers is evaluated.

In step S161, the performance skill improvement system 111 sets the fingers to be measured and the order in which the fingers are moved. For example, the order in which the fingers are moved may be input by the user, or a preset order may be selected by the user.

In step S162, the performance skill improvement system 111 is ready to start measurement for evaluating agility.

In step S163, using the agility measurement screen shown in FIG. 20, the performance skill improvement system 111 sets a load required for depressing the keyboard 147 when evaluating agility.

In step S164, with the performance skill improvement system 111, the user moves his/her fingers in the set order for number of times having been set. In response, the control circuit 162 records the time required from when the keyboard 147 starts to descend to when the keyboard 147 descends to the deepest, and supplies the time to the device control unit 171.

In step S165, the device control unit 171 calculates the mean value of the periods of time required for the user to depress the keyboard 147 from the time supplied in step S164.

In step S166, the device control unit 171 determines whether or not to end the measurement for evaluating agility. For example, when measurement with a desired load for evaluating agility is completed, the user can use the input unit 131 to input an instruction for ending the measurement, and the determination is made in response to the input.

In a case where the device control unit 171 determines in step S166 not to end the measurement for evaluating agility, the processing returns to step S163, and after the user sets a different load, the similar processing is repeated thereafter. On the other hand, in a case where the device control unit 171 determines in step S166 to end the measurement for evaluating agility, the processing proceeds to step S167.

In step S167, the device control unit 171 controls the display control unit 174 to cause the display unit 132 to display the mean value of the periods of time calculated in step S165 as a score representing agility, and then the second agility evaluation processing is ended.

As described above, by evaluating the agility while changing the load required to depress the keyboard 147, the performance skill improvement system 111 can also evaluate the level of adaptability of the user. For example, in the curve shown in FIG. 22, if the user can exhibit agility without depending on the finger strength, the user is evaluated to be high in adaptability.

Figure 26:
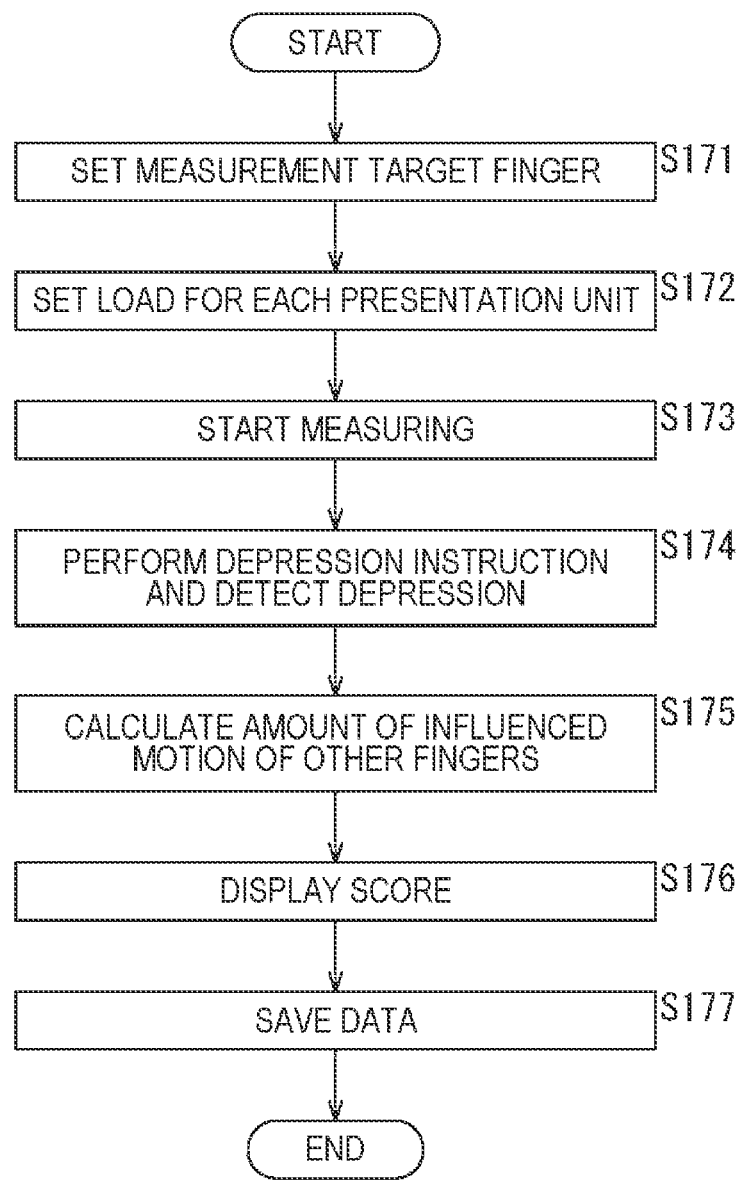
FIG. 26 is a flowchart explaining independence evaluation processing.

FIG. 24 is a view showing a display example of an independence measurement screen displayed during measurement of the independence evaluation processing explained with reference to FIG. 26 described later.

Figure 25:
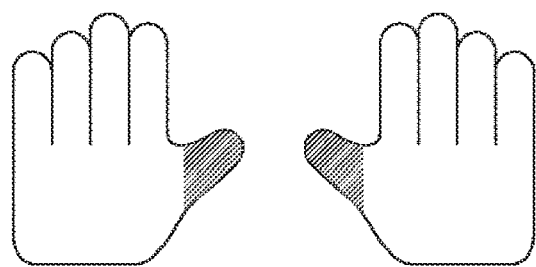
FIG. 25 is a view showing an example of a GUI for selecting a finger.

For example, the independence measurement screen displays a GUI for selecting a finger to be measured. The example shown in FIG. 24 displays that the index finger of the right hand has been selected as a measurement target as represented by hatching. Note that as a GUI for selecting a finger to be measured, an icon representing the shape of the fingers as shown in FIG. 25 may be used, and the color of the selected finger is changed (hatched in the example shown in FIG. 25).

Moreover, the independence measurement screen displays a bar indicating the depth to which the keyboard 147 on which the five fingers are placed is pushed, and a terminal position display unit is displayed above each bar. Then, when the keyboard 147 is depressed to the terminal position of the keyboard 147, the display of the terminal position display unit of the keyboard 147 changes (for example, color changes) as indicated by hatching on the independence measurement screen on the lower side of FIG. 24.

The independence evaluation processing of evaluating the independence of the finger in the performance skill improvement system 111 will be described with reference to the flowchart shown in FIG. 26.

In step S171, the performance skill improvement system 111 sets a finger to be measured using the independence measurement screen of FIG. 24.

In step S172, the performance skill improvement system 111 uses the independence measurement screen shown in FIG. 24 to set a load required for depressing the keyboard 147 when evaluating the independence of the finger. At this time, the load of the keyboard 147 depressed by the finger to be measured is set to various magnitudes, and the loads of the other keyboards 147 are set to be as small (light) as possible. For example, it is assumed that the more the force is required to be applied to one finger, the more the other fingers are easily influenced, and the independence can be evaluated more accurately by calculating the score for each load of the keyboard 147.

In step S173, the performance skill improvement system 111 is ready to start measurement for evaluating the independence of the fingers.

In step S174, the performance skill improvement system 111 issues a depression instruction to depress the keyboard 147 by a specified number of times, and the user depresses the keyboard 147 with the finger set in step S171 according to the specified number of times. At this time, with all the fingers placed on the keyboard 147, the user depresses the keyboard 147 to the terminal position by a specified number of times with the finger to be measured.

Then, the control circuit 162 acquires the position data (for example, 5 position data when 5 fingers are placed on the keyboard 147) supplied from the position sensor 143 and supplies it to the device control unit 171. Thereafter, when the control circuit 162 detects the specified number of times of depressions, the measurement ends, and the processing proceeds to step S175.

In step S175, the device control unit 171 calculates how much the other fingers are influenced and moved in the series of task.

In step S176, the device control unit 171 controls the display control unit 174 to cause the display unit 132 to display the result of calculation in step S175 as a score representing independence.

In step S177, in response to the operation of the storage button displayed on the independence measurement screen of FIG. 24, the device control unit 171 stores, in the storage medium 176, the score representing the independence displayed on the display unit 132 in step S176 and then the independence evaluation processing is ended.

Figure 27:
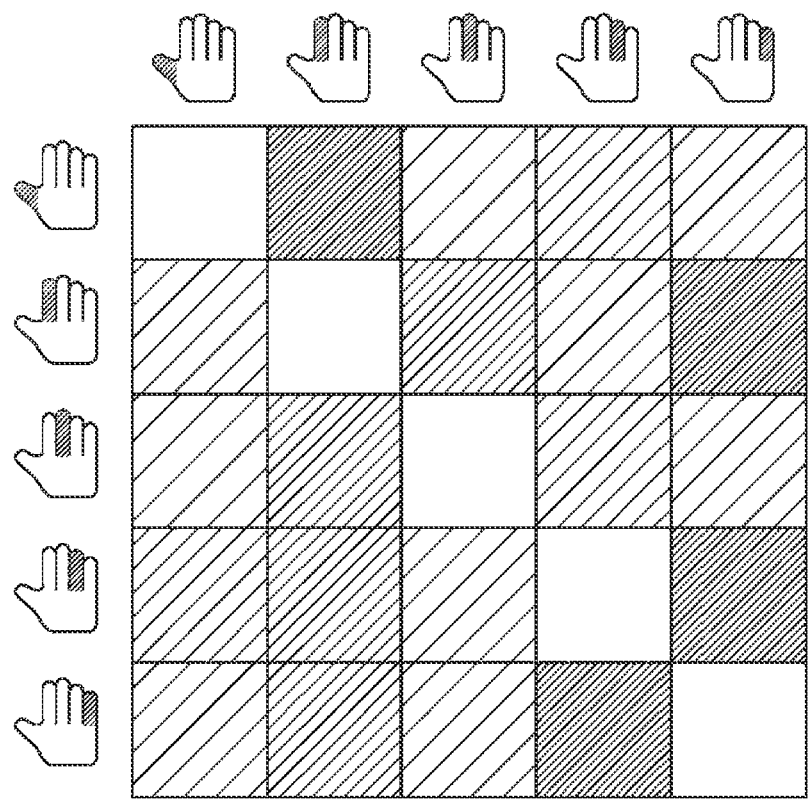
FIG. 27 is a view showing a display example in which scores indicating independence are displayed in a matrix.

FIG. 27 shows a display example in which a score indicating independence obtained in the independence evaluation processing is displayed in a color matrix. For example, in a matrix where the vertical direction represents the finger to be measured and the horizontal direction represents the other fingers, the easier the finger is influenced by the finger to be measured, the deeper the color (fine hatching) is displayed.

Figure 28:
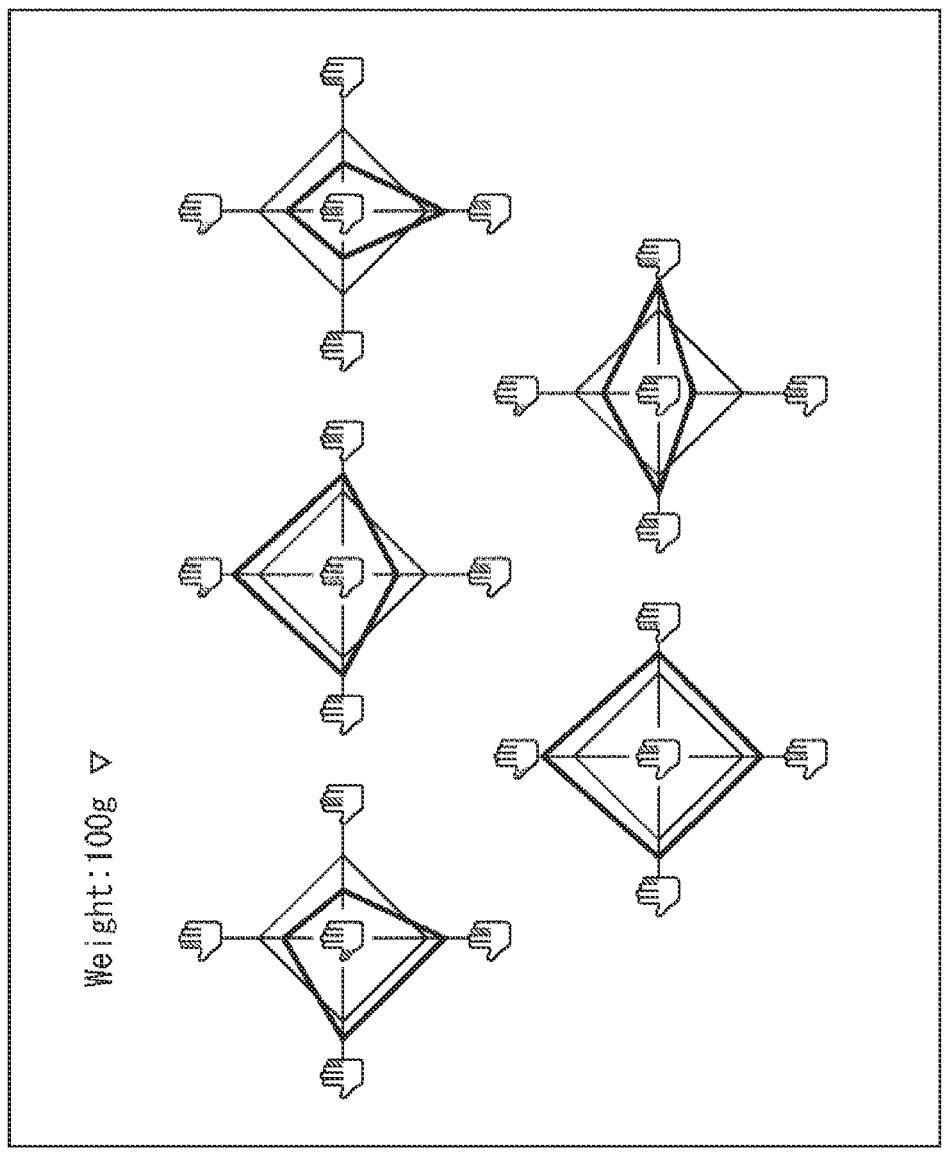
FIG. 28 is a view showing a display example in which scores indicating independence are displayed on a radar chart for each finger.

FIG. 28 shows a display example in which the score representing the independence obtained in the independence evaluation processing is displayed in a radar chart for each finger. For example, in each radar chart, the finger to be measured is shown in the center, and the other fingers are shown in four directions of up and down and left and right. A radar chart is displayed such that the easier the finger is influenced to move by the finger to be measured, the more it is outward. In addition, this radar chart is displayed for each load required for depressing the keyboard 147.

Figure 29:
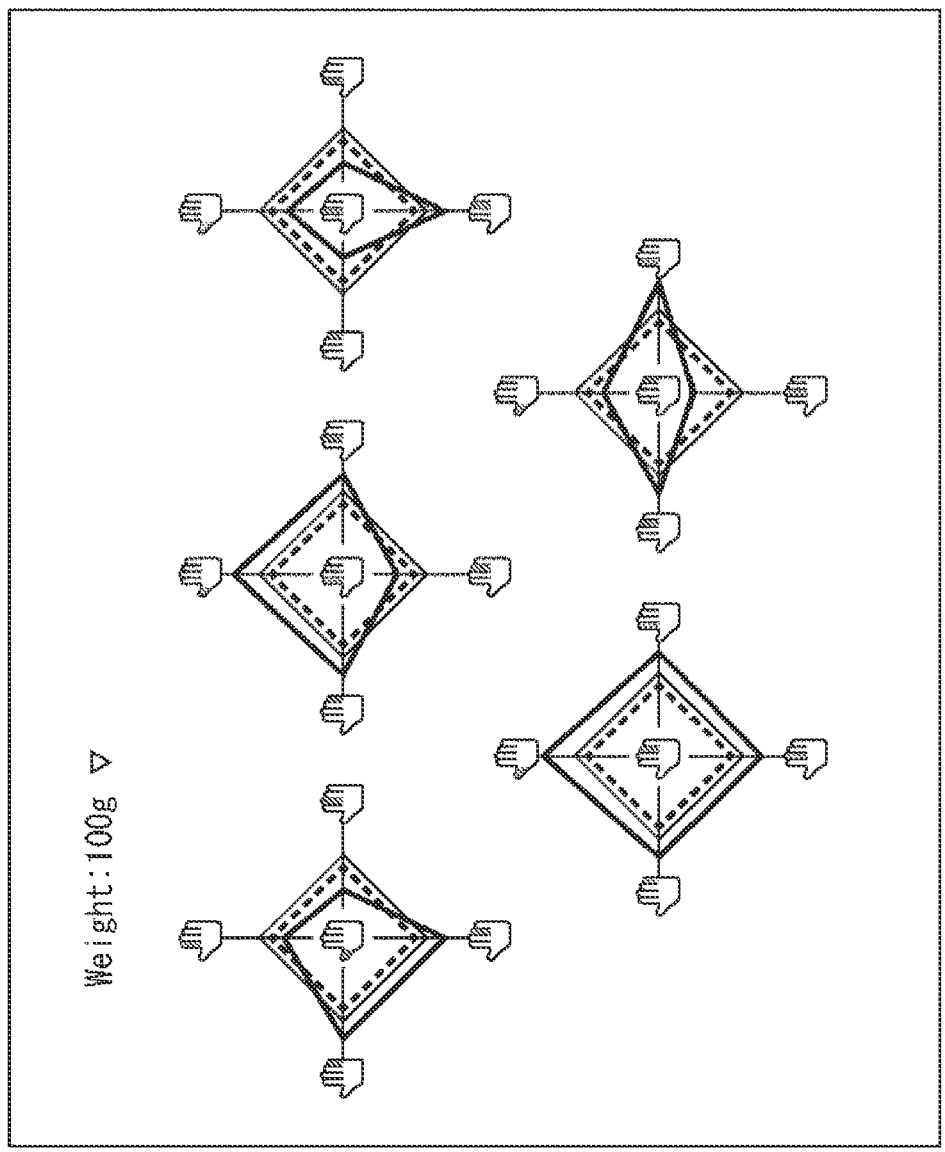
FIG. 29 is a view showing another display example of a radar chart.

Furthermore, as shown in FIG. 29, for example, a radar chart of broken lines representing, for example, the mean data of the group, the past data of the user, and the like are superimposed on the radar chart of each finger representing the score representing the independence, whereby it is possible to compare them.

Figure 30:
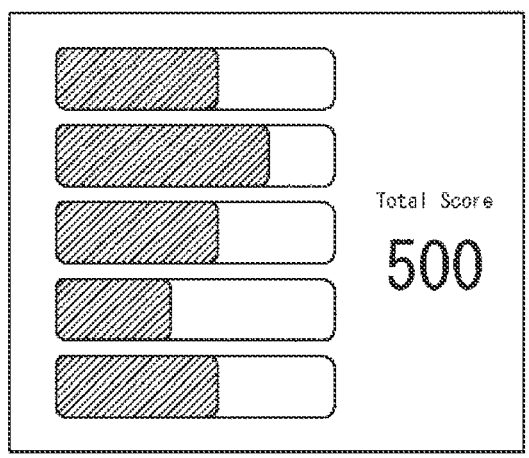
FIG. 30 is a view showing a display example in which scores indicating independence are displayed in bar graphs.

FIG. 30 shows a display example in which scores representing the independence obtained in the independence evaluation processing are displayed in a bar graph. For example, a mean value obtained for each finger for which independence is evaluated can be displayed as a bar graph represented by imitating the shape of the keyboard 147. Furthermore, the total score obtained from those numerical values can be displayed.

Figure 31:
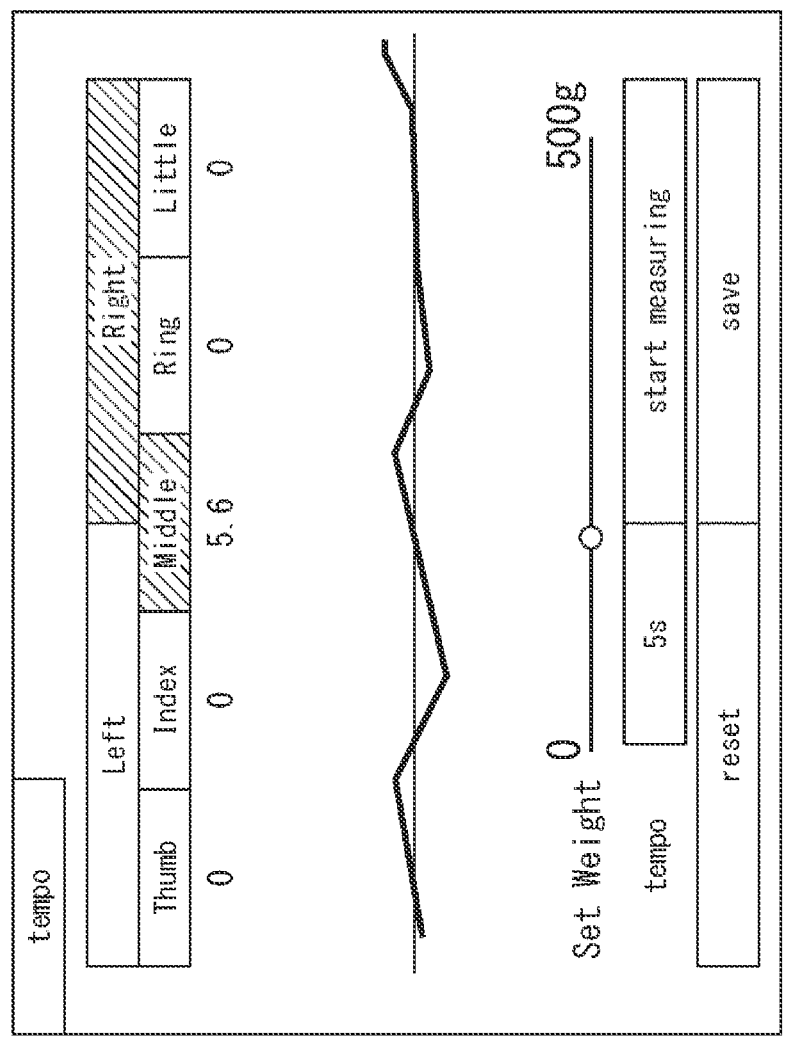
FIG. 31 is a view showing a display example of a time accuracy measurement screen.
Figure 32:
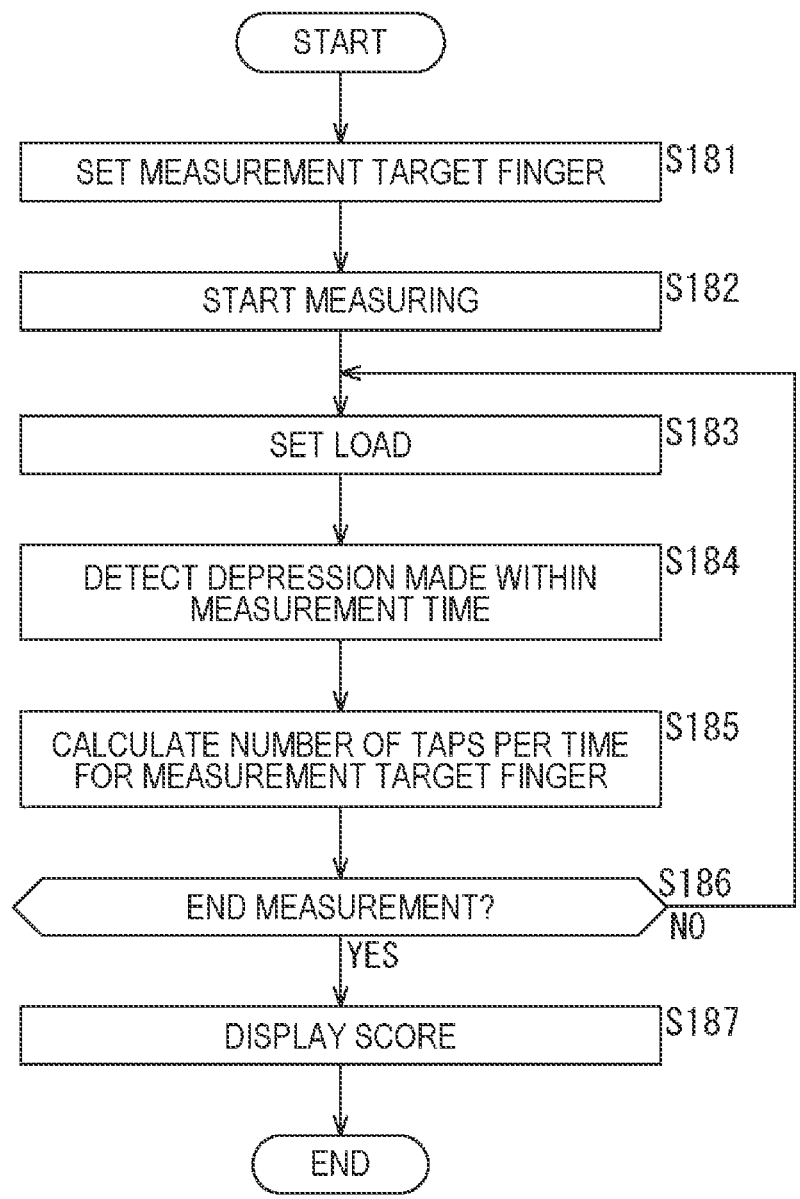
FIG. 32 is a flowchart explaining first time accuracy evaluation processing.
Figure 34:
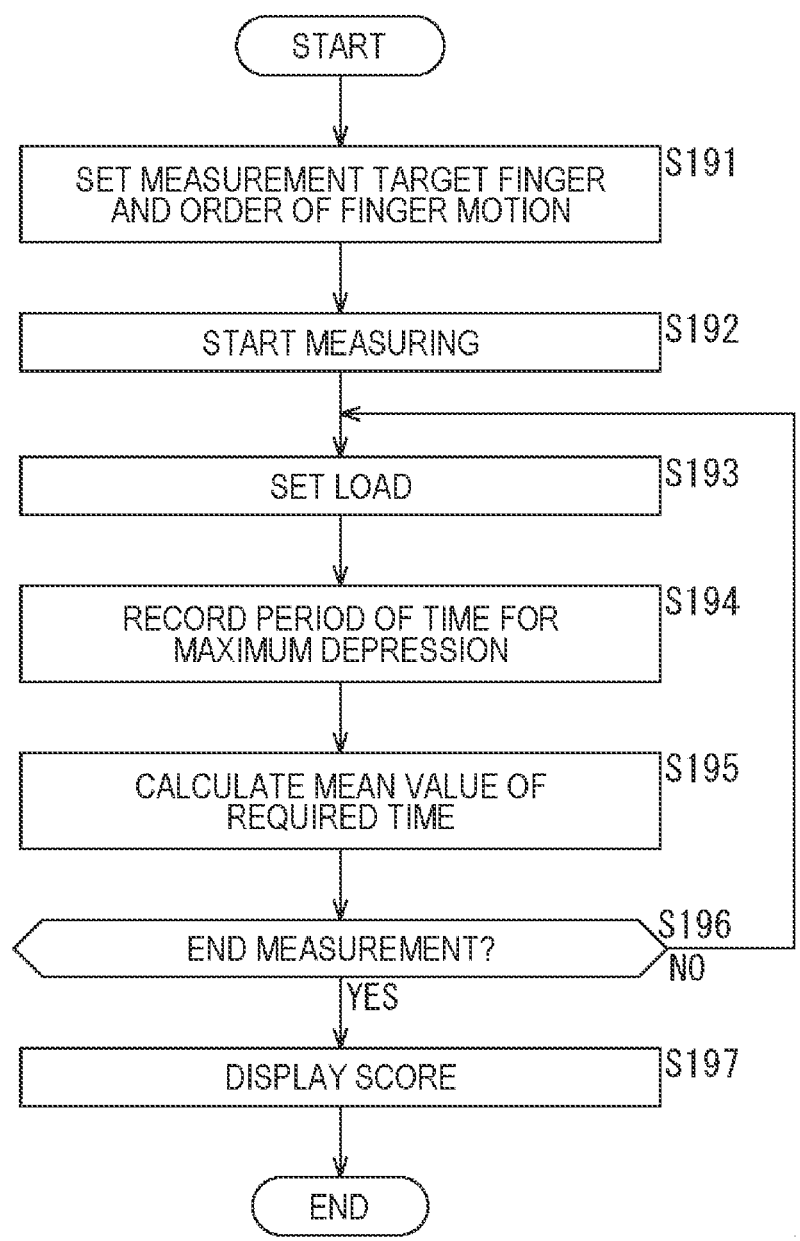
FIG. 34 is a flowchart explaining second time accuracy evaluation processing.

FIG. 31 is a view showing a display example of a time accuracy measurement screen displayed during measurement of the time accuracy evaluation processing explained with reference to FIGS. 32 and 34 described later.

For example, the time accuracy measurement screen displays a GUI for selecting a finger to be measured. The example shown in FIG. 31 displays that the middle finger of the right hand has been selected as a measurement target as represented by hatching. In addition, the time accuracy measurement screen displays a graph showing the fluctuation in tempo with respect to the target value. Note that the fluctuation in tempo may be expressed numerically.

Furthermore, the time accuracy measurement screen displays GUIs such as a slider for setting a load required for depressing the keyboard 147, a button for setting a measurement time, a button for instructing start of the measurement time, a button for resetting the measurement result, and a button for storing the measurement result.

The first time accuracy evaluation processing of evaluating the time accuracy in the performance skill improvement system 111 will be described with reference to the flowchart shown in FIG. 32. Note that in the first time accuracy evaluation processing, agility in depressing with one finger or agility in depressing with a plurality of fingers simultaneously (for example, chords) is evaluated.

In step S181, in the performance skill improvement system 111, a finger to be measured (a plurality of fingers in a case of depressing simultaneously by a plurality of fingers) is set. For example, the device control unit 171 controls the display control unit 174 to cause the display unit 132 to display the time accuracy measurement screen shown in FIG. 31. Therefore, by using the input unit 131, the user can input selection of a right hand or a left hand to the time accuracy measurement screen, and input selection of a finger to be measured on the selected hand. Then, the input acquisition unit 175 supplies information indicating the finger selected by the user to the device control unit 171, and the device control unit 171 sets the finger indicated by the information as the measurement target.

In step S182, the performance skill improvement system 111 is ready to start measurement for evaluating time accuracy.

In step S183, the performance skill improvement system 111 sets a load required for depressing the keyboard 147 when evaluating the time accuracy. For example, the user can set the load on the time accuracy measurement screen of FIG. 31 by the position of the slider of Set Weight using the input unit 131. Then, the input acquisition unit 175 acquires information indicating the load set by the user, supplies the information to the control circuit 162 via the device control unit 171, and controls the drive circuit 163. That is, the device control unit 171 controls the control circuit 162 on the basis of the information. Thus, a current is supplied from the drive circuit 163 to the actuator 146 so as to generate a force that pushes down the keyboard 147 by the user applying the load to the keyboard 147.

In step S184, with the performance skill improvement system 111, the user depresses the keyboard 147 as many times as possible within a preset measurement time (5 seconds in the example shown in FIG. 31). At this time, the control circuit 162 detects the number of times of depressions of the keyboard 147 on the basis of the position data supplied from the position sensor 143, and supplies the detected number of times to the device control unit 171.

In step S185, the device control unit 171 calculates the number of taps per time for the finger set as the measurement target in step S151.

In step S186, the device control unit 171 determines whether or not to end the measurement for evaluating time accuracy. For example, when the measurement of the finger for evaluating time accuracy at a desired load is completed, the user can input, by using the input unit 131, an instruction to end the measurement, and the determination is performed according to this input.

In a case where the device control unit 171 determines in step S186 not to end the measurement for evaluating time accuracy, the processing returns to step S183, and after the user sets a different load, the similar processing is repeated thereafter. On the other hand, in a case where the device control unit 171 determines in step S186 to end the measurement for evaluating time accuracy, the processing proceeds to step S187.

Figure 33:
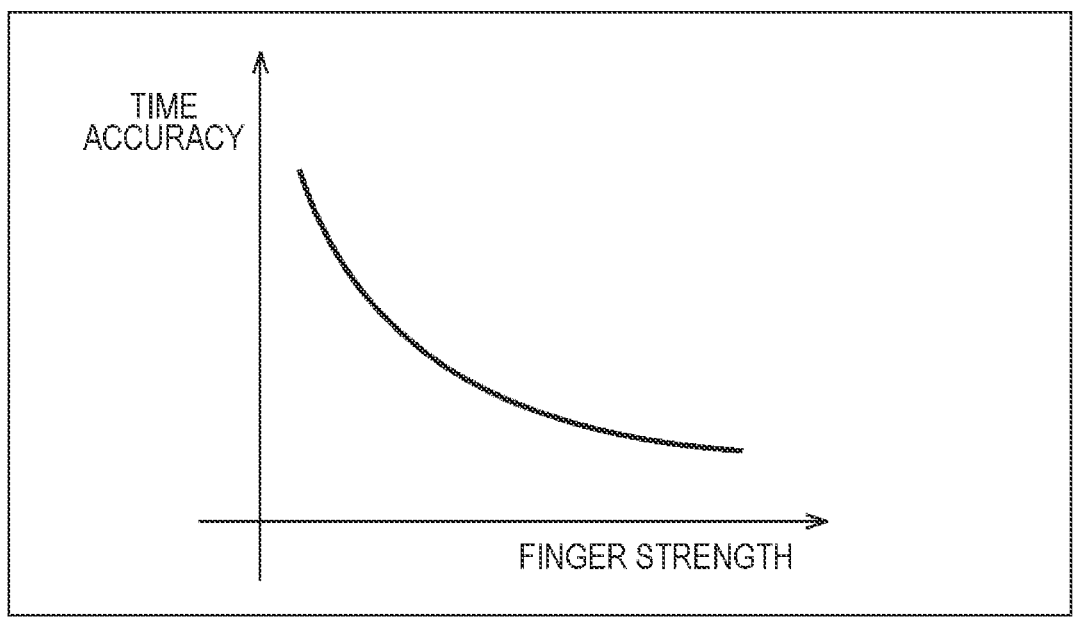
FIG. 33 is a view showing an example of a measurement result showing a relationship between a finger strength and time accuracy.

In step S187, the device control unit 171 acquires, as a measurement result, a curve representing the relationship between the strength of the finger having depressed the keyboard 147 and the time accuracy of the finger, as shown in FIG. 33, with the number of taps calculated for each measured load as the time accuracy. Then, the device control unit 171 controls the display control unit 174 to cause the display unit 132 to display the curve as a score representing time accuracy, and then the first time accuracy evaluation processing is ended.

The second time accuracy evaluation processing of evaluating the time accuracy in the performance skill improvement system 111 will be described with reference to the flowchart shown in FIG. 34. Note that, in the second time accuracy evaluation processing, agility at the time of continuously depressing with a plurality of fingers is evaluated.

In step S191, the performance skill improvement system 111 sets the fingers to be measured and the order in which the fingers are moved. For example, the order in which the fingers are moved may be input by the user, or a preset order may be selected by the user.

In step S192, the performance skill improvement system 111 is ready to start measurement for evaluating time accuracy.

In step S193, the performance skill improvement system 111 uses the time accuracy measurement screen shown in FIG. 31 to set a load required for depressing the keyboard 147 when evaluating the time accuracy.

In step S194, with the performance skill improvement system 111, the user moves his/her fingers in the set order for number of times having been set. In response, the control circuit 162 records the time required from when the keyboard 147 starts to descend to when the keyboard 147 descends to the deepest, and supplies the time to the device control unit 171.

In step S195, the device control unit 171 calculates the mean value of the periods of time required for the user to depress the keyboard 147 from the time supplied in step S194.

In step S196, the device control unit 171 determines whether or not to end the measurement for evaluating time accuracy. For example, when measurement with a desired load for evaluating time accuracy is completed, the user can use the input unit 131 to input an instruction for ending the measurement, and the determination is made in response to the input.

In a case where the device control unit 171 determines in step S196 not to end the measurement for evaluating time accuracy, the processing returns to step S193, and after the user sets a different load, the similar processing is repeated thereafter. On the other hand, in a case where the device control unit 171 determines in step S196 to end the measurement for evaluating time accuracy, the processing proceeds to step S197.

In step S197, the device control unit 171 controls the display control unit 174 to cause the display unit 132 to display the mean value of the periods of time calculated in step S195 as a score representing time accuracy, and then the second time accuracy evaluation processing is ended.

As described above, by evaluating the time accuracy while changing the load required to depress the keyboard 147, the performance skill improvement system 111 can also evaluate the level of adaptability of the user. For example, in the curve shown in FIG. 33, if the user can exhibit time accuracy without depending on the finger strength, the user is evaluated to be high in adaptability.

A usage example of the haptic presentation device 112 via a network will be explained with reference to FIG. 35.

For example, in a case where the haptic presentation device 112 includes a communication function, it can be connected to the database 192 and the external terminal 193 via a network 191. An analysis server 194 is also connected to the network 191.

The haptic presentation device 112 performs communication via the network 191, and transmits, to the database 192 and the external terminal 193, measurement data (for example, in the case of agility, the number of times the button is depressed within the measurement time) obtained by the measurement by the haptic presentation device 112, for example. Then, the measurement data transmitted from the haptic presentation device 112 can be confirmed by the external terminal 193 such as a smartphone or a tablet.

Figure 36:
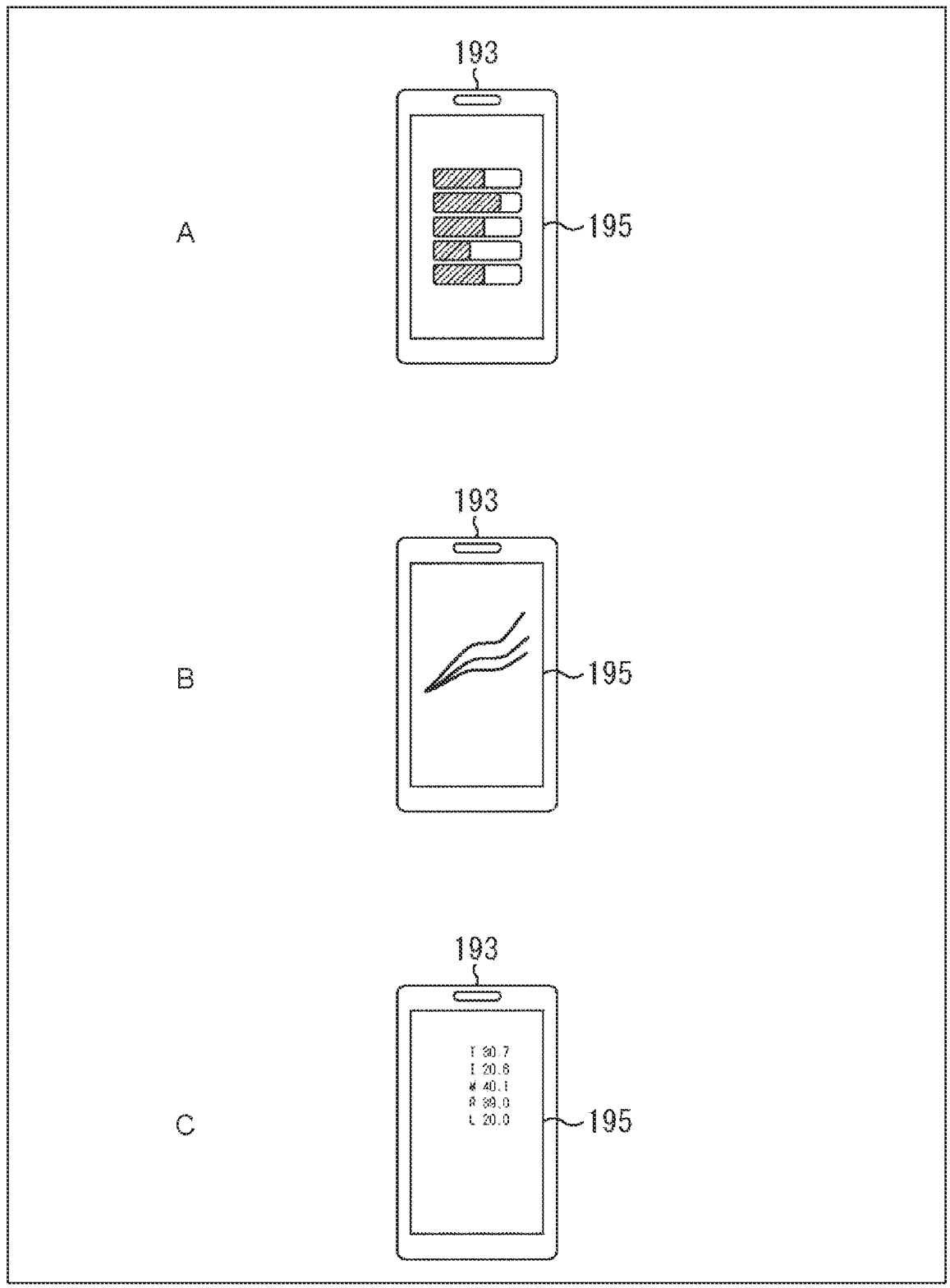
FIG. 36 is a view showing a display example of measurement data displayed by an external terminal.

For example, as shown in FIG. 36, a display unit 195 of the external terminal 193 can display measurement data in various display formats. A of FIG. 36 shows a display example displaying measurement data between fingers so as to be compared by a bar graph. B of FIG. 36 shows a display example displaying a log of measurement data in a time-series graph. C of FIG. 36 shows a display example displaying the numerical values of the measurement data in a table format.

In addition, the haptic presentation device 112 can perform wired communication or wireless communication, and can also directly transmit measurement data to the external terminal 193 by infrared communication, near-field communication, or the like. Furthermore, in a case where the haptic presentation device 112 has a display function for displaying a two-dimensional code representing measurement data, the haptic presentation device 112 may have a configuration in which the external terminal 193 is caused to read the two-dimensional code. Thus, by directly transmitting the measurement data from the haptic presentation device 112, for example, it is possible to achieve seamless evaluation and training without using a personal computer.

Furthermore, by the analysis server 194 performing data analysis on the history of measurement data recorded in the database 192, it is possible to recommend appropriate training for improving performance skills. Then, the user can reserve the next training by using the external terminal 193.

Note that by configuring the haptic presentation device 112 to include a storage medium and the like with a display unit, it is possible to store measurement data in the haptic presentation device 112 and display and confirm the log.

Thus by using the haptic presentation device 112 via the network 191, it is possible to store a log for each evaluation item, and to confirm the growth, improvement, and the like on the time axis of each finger. Furthermore, by presenting, to the user, the measurement data together with a general numerical value, it is possible to inform the user of the advantages and disadvantages of each evaluation item. Furthermore, the analysis server 194 can obtain and calculate statistics for data of a large number of users, and thus it is possible to make recommendations for practice regarding items that should be more improved among several evaluation items. At the time of such presentation, comparison between fingers may be performed.

FIGS. 37 to 40 show the internal structure of the haptic presentation device 112.

Figure 37:
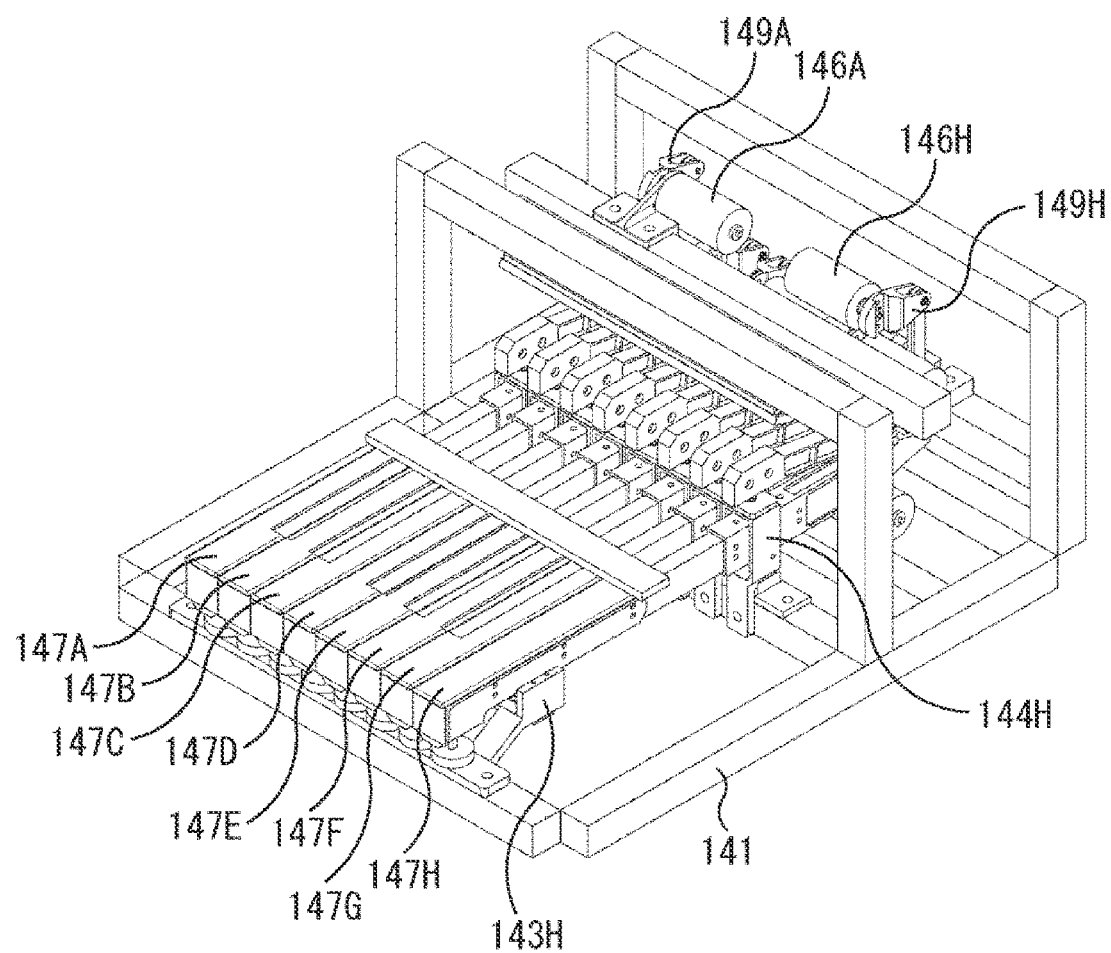
FIG. 37 is a perspective view of an internal structure of the haptic presentation device.
Figure 38:
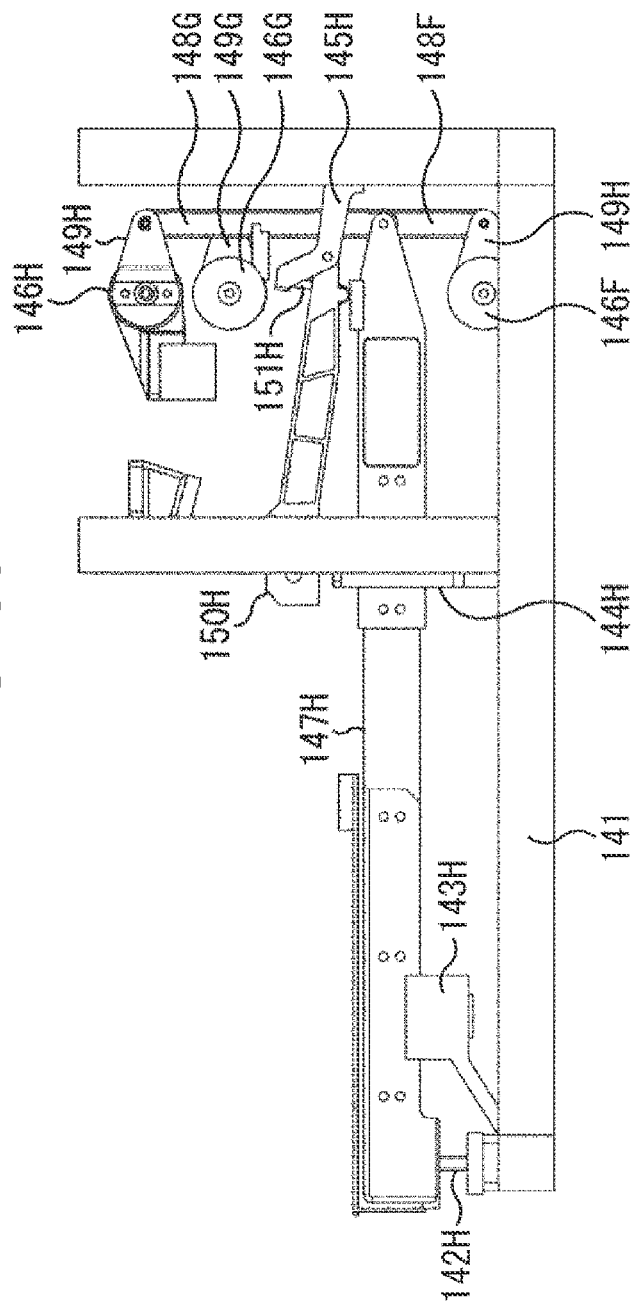
FIG. 38 is a right side view of the internal structure of the haptic presentation device.
Figure 39:
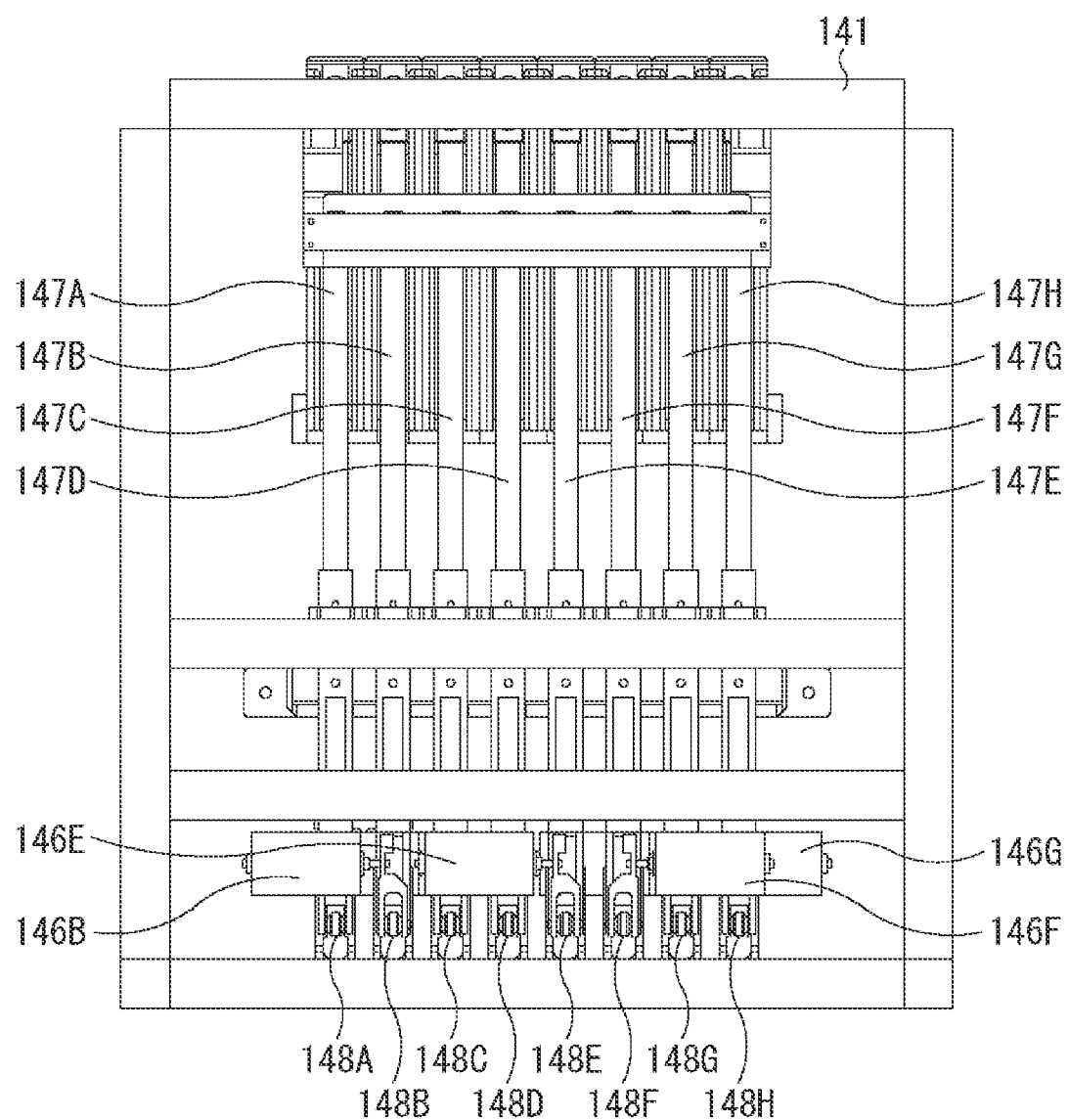
FIG. 39 is a bottom view of the internal structure of the haptic presentation device.
Figure 40:
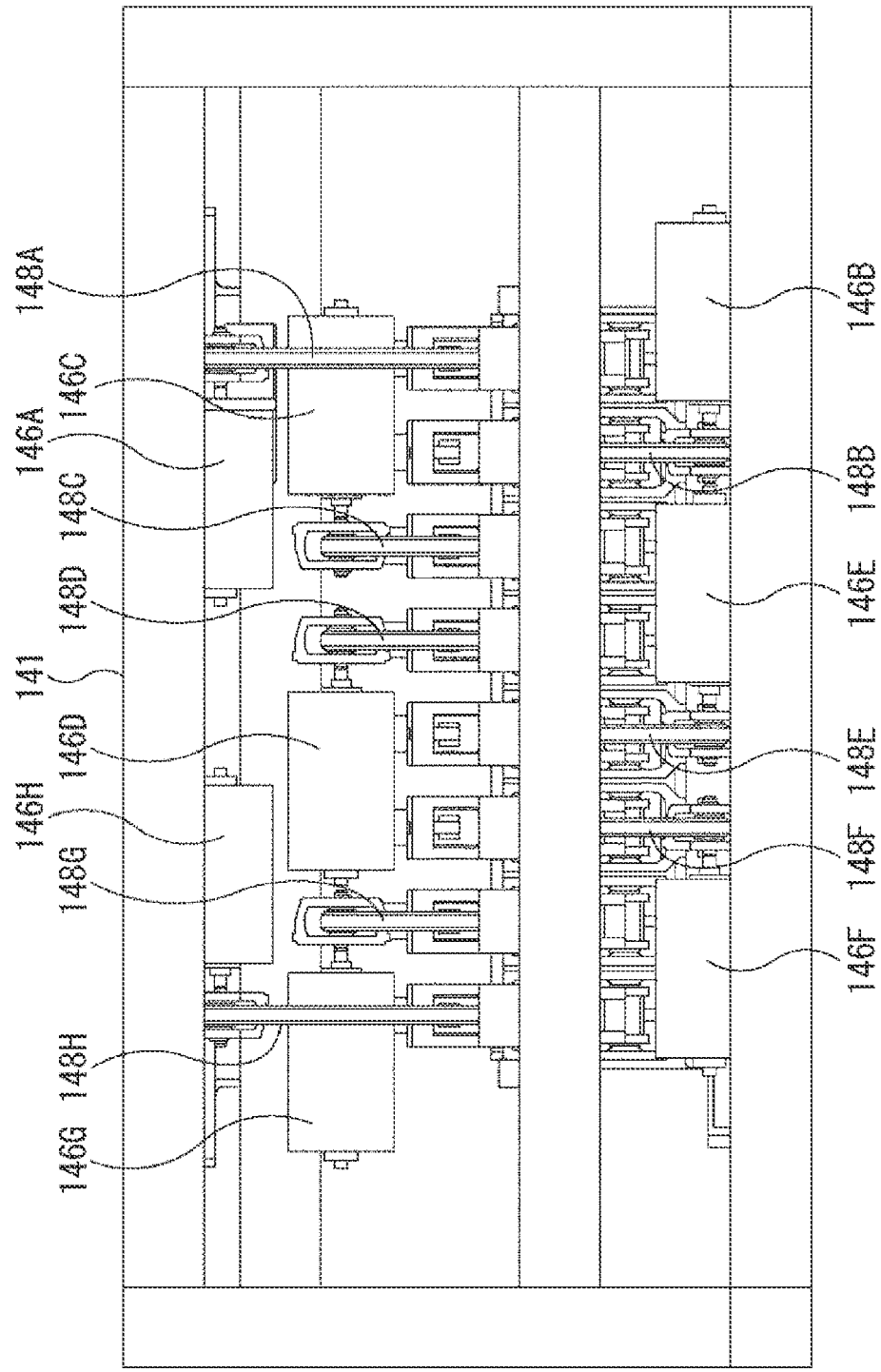
FIG. 40 is a rear view of the internal structure of the haptic presentation device.

FIG. 37 is a perspective view of the internal structure of the haptic presentation device 112, and FIG. 38 is a right side view of the internal structure of the haptic presentation device 112. In addition, FIG. 39 is a bottom view of the internal structure of the haptic presentation device 112, and FIG. 40 is a rear view of the internal structure of the haptic presentation device 112.

As shown in FIGS. 37 to 40, the keyboards 147A to 147H are arranged adjacent to each other similarly to a general piano, and actuators 146A to 146H for providing haptic sensation are provided on the rear surface side.

Furthermore, the actuator 146A and the actuator 146H are arranged at the first arrangement position shown in FIG. 8, and the actuator 146C, the actuator 146D, and the actuator 146G are arranged at the second arrangement position shown in A of FIG. 10. Furthermore, the actuator 146B, the actuator 146E, and the actuator 146F are arranged in the third arrangement position shown in B of FIG. 10.

Such internal structure enables the haptic presentation device 112 to arrange the keyboards 147A to 147H at intervals similar to those of a general piano while avoiding overlapping of the adjacent actuators 146. Furthermore, the haptic presentation device 112 can be further miniaturized by arranging the actuators 146A to 146H in such a narrow space.

Note that FIGS. 37 to 40 show a configuration example of the haptic presentation device 112 having the eight keyboards 147A to 147H corresponding to one octave. However, the number of keyboards 147 provided in the haptic presentation device 112 is not limited to eight. That is, the haptic presentation device 112 may include eight keyboards 147 or less, and for example, can include five keyboards 147 corresponding to one hand. The haptic presentation device 112 may include eight or more keyboards 147, and for example, can include 16 keyboards 147 corresponding to two octaves.

<Configuration Example of Computer>

Next, the series of processing (information processing method) described above can be performed by hardware or can be performed by software. In a case where the series of processing is performed by software, a program constituting the software is installed in a general-purpose computer or the like.

Figure 41:
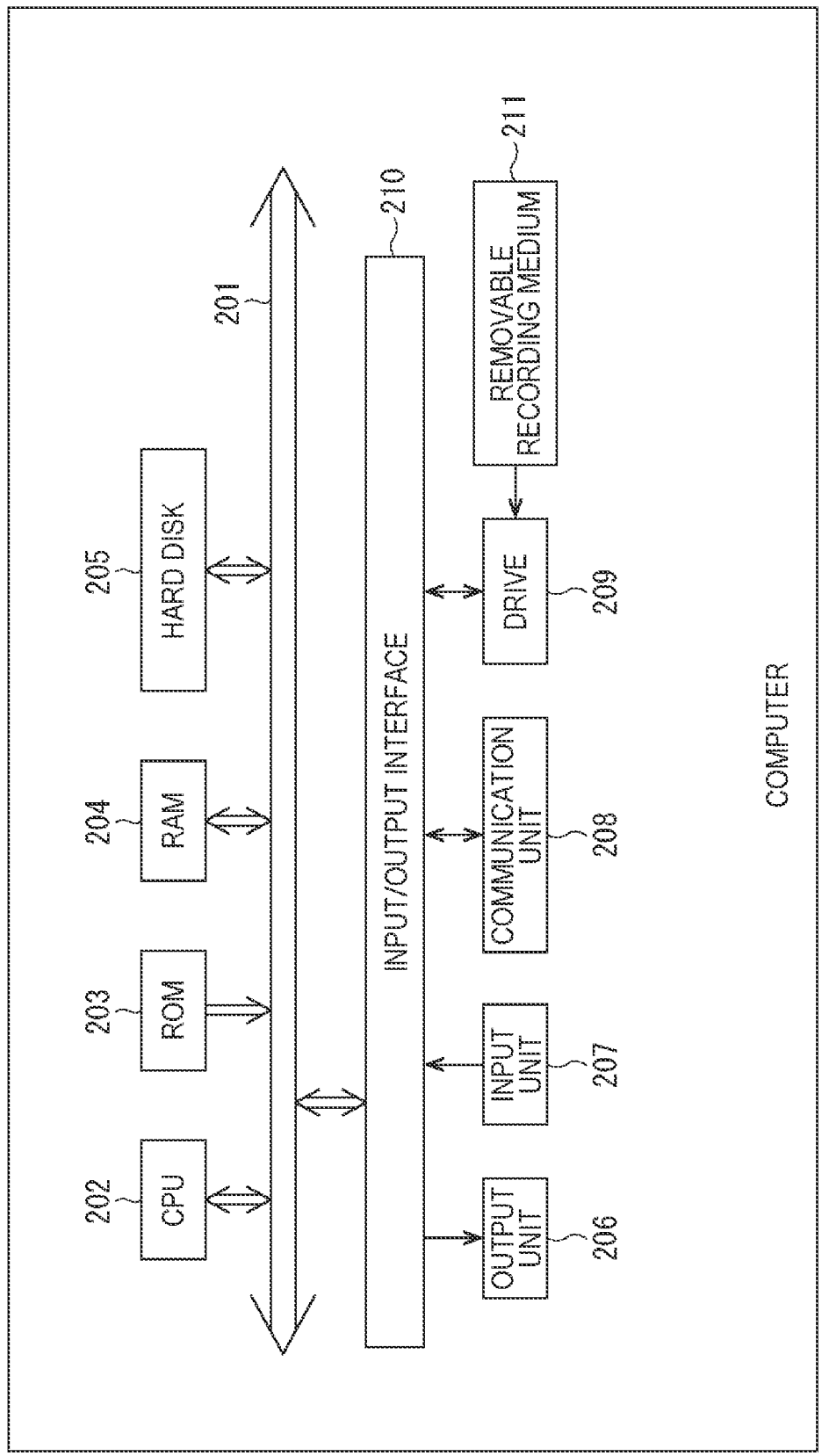
FIG. 41 is a block diagram showing a configuration example of one embodiment of a computer to which the present technology is applied.

FIG. 41 is a block diagram showing a configuration example of one embodiment of the computer to which the present technology is applied.

The program can be recorded in advance on a hard disk 205 or a ROM 203 as a recording medium built in the computer.

Alternatively, the program can be stored (recorded) in a removable recording medium 211 driven by a drive 209. Such removable recording medium 211 can be provided as so-called package software. Here, the removable recording medium 211 includes, for example, a flexible disk, a compact disc read only memory (CD-ROM), a magneto optical (MO) disk, a digital versatile disc (DVD), a magnetic disk, a semiconductor memory, and the like.

Note that the program can be installed on the computer from the removable recording medium 211 as described above, or can be downloaded to the computer via a communication network or a broadcasting network and installed on the built-in hard disk 205. That is, the program can be transferred wirelessly from a download site to the computer via an artificial satellite for digital satellite broadcasting, or can be transferred by wire to the computer via a network such as a local area network (LAN) or the Internet.

The computer incorporates a central processing unit (CPU) 202, and an input/output interface 210 is connected to the CPU 202 via a bus 201.

The CPU 202 executes a program stored in the read only memory (ROM) 203 in accordance with a command having been input via the input/output interface 210 by the user when, for example, operating an input unit 207. Alternatively, the CPU 202 loads the program stored in the hard disk 205 into the random access memory (RAM) 204 and executes it.

Thus, the CPU 202 performs processing according to the above-described flowchart or processing performed by the configuration of the above-described block diagram. Then, via the input/output interface 210, where necessary, for example, the CPU 202 outputs the processing result from the output unit 206, transmits the processing result from the communication unit 208, records the processing result in the hard disk 205, or the like.

Note that the input unit 207 includes a keyboard, a mouse, a microphone, and the like. In addition, the output unit 206 includes a liquid crystal display (LCD), a speaker, and the like.

Here, in the present description, the processing performed by the computer according to the program is not necessarily performed in time series along the order described in the flowchart. That is, the processing executed by the computer according to the program includes processing executed in parallel or individually (for example, parallel processing or object processing).

In addition, the program may be processed by one computer (processor) or may be distributed and processed by a plurality of computers. Furthermore, the program may be transferred to a remote computer and executed.

Furthermore, in this description, a system means a set of plurality of elements (devices, modules (components), and the like), and it does not matter whether or not all the elements are in a same housing. Thus, a plurality of devices housed in separate housings and connected via the network, and a single device in which a plurality of modules is housed in a single housing are both systems.

Furthermore, for example, the configuration described as one device (or processing unit) may be divided and configured as a plurality of devices (or processing units). In contrast, the configuration described above as a plurality of devices (or processing units) may be collectively configured as one device (or processing unit). It is also possible to add a configuration other than the above to the configuration of each device (or each processing unit). Furthermore, if the configuration and operation as the overall system are substantially the same, a part of the configuration of one device (or processing unit) may be included in the configuration of another device (or another processing unit).

In addition, for example, the present technology can assume a form of a cloud computing in which one function is shared by a plurality of devices via a network and is processed in cooperation.

Moreover, for example, the program described above can be executed in a discretionary device. In this case, the device is only required to have a necessary function (function block and the like) and to obtain necessary information.

Furthermore, for example, each step described in the above flowcharts can be executed by one device or can be executed by a plurality of devices. Furthermore, in a case where a single step includes a plurality of pieces of processing, the plurality of pieces of processing included in the single step can be executed by one device or executed by a plurality of devices in a shared manner. In other words, a plurality of pieces of processing included in one step can be executed as processing of a plurality of steps. In contrast, the processing described as a plurality of steps can be collectively executed as one step.

Note that, in the program executed by the computer, the processing of the step of describing the program may be executed in time series along the order explained in this description, or may be executed in parallel or individually at necessary timing such as when a call is made. That is, as long as no conflict occurs, the processing of each step may be executed in an order different from the order described above. Furthermore, the processing of the step describing this program may be executed in parallel with the processing of another program, or may be executed in combination with the processing of another program.

Note that a plurality of present technologies described in this description can be implemented independently of each other as long as no conflict occurs. Of course, it is possible to implement a discretionary plurality of present technologies in combination. For example, a part or entirety of the present technology described in any embodiment may be combined with a part or entirety of the present technology described in other embodiments. In addition, a part or entirety of the above-described discretionary present technology can be implemented in combination with another present technology not described above.

<Combination Examples of Configuration>

Note that the present technology can also have the following configurations.

(1)

An information processing device including:

a load weight control unit that controls generation of a load weight that becomes a load with respect to a motion when a user depresses a depression target object; and a recognition unit that recognizes a motion of the depression target object, in which the load weight control unit performs control of starting generation of the load weight that is predetermined at a timing when the recognition unit recognizes that the depression target object has started to be depressed, and ending generation of the load weight at a timing when the recognition unit recognizes that the depression target object ended to be depressed and started to return.

(2)

The information processing device according to (1) described above, in which in a case where the load weight control unit has a configuration in which an own weight of a force sense presentation device that generates the load weight to the depression target object is applied to the depression target object, the load weight control unit controls generation of the load weight that cancels an own weight of the force sense presentation device, and even after generation of the load weight is ended, continues control of generating the load weight that cancels an own weight of the force sense presentation device.

(3)

The information processing device according to (1) or (2) described above, in which the load weight control unit controls of stopping generation of the load weight when the recognition unit recognizes that a first depression on the depression target object has been performed, and generating the load weight when the recognition unit recognizes a second depression on the depression target object has been performed.

(4)

The information processing device according to any of (1) to (3) described above, further including:

a response acquisition unit that acquires a response that indicates presence/absence of generation of the load weight by the user, after the user depresses the depression target object.

(5)

The information processing device according to (3) described above, in which processing in which the load weight control unit performs control of randomly selecting and generating a plurality of the load weights, and processing in which the response acquisition unit acquires the response to the load weight are repeated, and the information processing device further includes a threshold value calculation unit that calculates a threshold value that serves as an index of the load weight that can be discriminated by the user according to a ratio of a response that indicates presence of generation of the load weight for each of a plurality of the load weights acquired by the response acquisition unit.

(6)

The information processing device according to (5) described above, in which the load weight control unit randomly selects the load weight from a range of 0.1 [N] to 1.4 [N].

(7)

The information processing device according to (4) or (5) described above, further including:

a determination unit that determines whether or not a response acquired by the response acquisition unit is correct according to the load weight generated by the load weight control unit, and gives the user feedback of a correct/incorrect result of the response.

(8)

The information processing device according to (7) described above, in which processing in which the load weight control unit performs control of randomly selecting and generating any one of generation of the load weight according to setting or stop of generation of the load weight, processing in which the response acquisition unit acquires the response to the load weight, and processing in which the determination unit gives the user feedback of a correct/incorrect result to a response acquired by the response acquisition unit are repeated a specified number of times, and the load weight control unit changes setting of the load weight to less than the load weight at present time in a case where a ratio of the specified number of times that the determination unit determines to be correct is equal to or greater than a predetermined ratio.

(9)

The information processing device according to any of (1) to (8) described above, in which the depression target object is a keyboard of a piano, and the recognition unit recognizes keystroke, in which the keyboard started to be depressed, and release key, in which the keyboard ended to be depressed and started to return.

(10)

The information processing device according to any of (4) to (9) described above, in which the depression target object is a keyboard of a piano, and the response acquisition unit is the keyboard of a discretionary musical scale other than the keyboard of a musical scale from which the load weight is generated.

(11)

The information processing device according to (1) described above, further including:

an actuator that outputs torque for generating the load weight; and a four-node link mechanism that has, as fixed ends, a rotation shaft of the actuator and a support shaft that supports the depression target object, and, as free ends, both ends of a slide member that transmits torque output from the actuator to the depression target object.

(12)

The information processing device according to (11) described above, further including:

a haptic presentation unit that has the actuator and the four-node link mechanism, and presents haptic sensation to a user who depresses the depression target object, in which each of a plurality of the haptic presentation units that is arranged adjacent to each other independently presents haptic sensation.

(13)

The information processing device according to (11) or (12) described above, in which current supplied to the actuator is stopped according to a frequency of depression on the depression target object or a predetermined specified time.

(14)

The information processing device according to (12) described above, further including:

a force sensor that detects a force applied to the depression target object, in which initialization processing of the haptic presentation unit is performed for obtaining a relationship between current being supplied to the actuator and force detected by the force sensor.

(15)

The information processing device according to (12) or (14) described above, in which haptic sensation presented by the haptic presentation unit that is predetermined among a plurality of the haptic presentation units is set to be different from haptic sensation presented by another of the haptic presentation unit, and processing of acquiring a response when a user who has depressed the depression target object responses regarding the haptic presentation unit to which the user felt that haptic sensation was different is repeated while changing setting of the haptic sensation to evaluate or train haptic sensation of a user.

(16)

The information processing device according to (12), (14), or (15) described above, in which predetermined haptic sensation is set in the haptic presentation unit, and processing of detecting depression of the depression target object by a user is repeated while changing setting of the haptic sensation to evaluate or train a motor function of a user's finger.

(17)

The information processing device according to claims (12) and (14) to (16), in which the haptic presentation unit is configured so that a default force that is required to depress the depression target object can be set in a state where no current is supplied to the actuator.

(18)

The information processing device according to (17) described above, in which the haptic presentation unit has a tip end vicinity of the depression target object that is pushed down by a user, and has a hammer mechanism whose one end is coupled to a predetermined shaft and another end is provided with a weight for generating a force that pushes down a rear end portion of the depression target object, and a spring that generates a force that pushes down a rear end portion of the depression target object, and the default force is set by adjusting a weight and moment of inertia of the hammer mechanism and a spring constant of the spring.

(19)

An information processing method including:

controlling, by an information processing device, generation of a load weight that becomes a load with respect to a motion when a user depresses a depression target object; and recognizing, by the information processing device, a motion of the depression target object, in which the information processing device performs control of starting generation of the load weight that is predetermined at a timing when the depression target object has started to be depressed is recognized, and ending generation of the load weight at a timing when the depression target object ended to be depressed and started to return is recognized.

(20)

A program for causing a computer of an information processing device to execute processing including:

controlling generation of a load weight that becomes a load with respect to a motion when a user depresses a depression target object; and recognizing a motion of the depression target object, and performing control of starting generation of the load weight that is predetermined at a timing when the depression target object has started to be depressed is recognized, and ending generation of the load weight at a timing when recognizing that the depression target object ended to be depressed and started to return is recognized.

It is to be noted that the embodiment of the present technology is not limited to the above-described embodiment, and various modifications may be made in a scope without departing from the spirit of the present technology. In addition, note that the effects described in the present description are merely examples and are not limited thereto, and other effects may be present.

REFERENCE SIGNS LIST

11 Performance skill improvement system
12 Force sense presentation device
13 Information processing device
14 Output device
21 Detection unit
22 Drive unit
31 Keystroke recognition unit
32 Load weight control unit
33 Response acquisition unit
34 Determination unit
Threshold value calculation unit
36 Result output unit
41 Keyboard
42 Fulcrum
43 Capstan button

The invention claimed is:

1. An information processing device comprising:
a load weight control unit that controls generation of a load weight that becomes a load with respect to a motion when a user depresses a depression target object; and
a recognition unit that recognizes a motion of the depression target object, wherein
the load weight control unit performs control of starting generation of the load weight that is predetermined at a timing when the recognition unit recognizes that the depression target object has started to be depressed, and ending generation of the load weight at a timing when the recognition unit recognizes that the depression target object ended to be depressed and started to return.

2. The information processing device according to claim 1, wherein
in a case where the load weight control unit has a configuration in which an own weight of a force sense presentation device that generates the load weight to the depression target object is applied to the depression target object, the load weight control unit controls generation of the load weight that cancels an own weight of the force sense presentation device, and even after generation of the load weight is ended, continues control of generating the load weight that cancels an own weight of the force sense presentation device.

3. The information processing device according to claim 1, wherein
the load weight control unit controls of stopping generation of the load weight when the recognition unit recognizes that a first depression on the depression target object has been performed, and generating the load weight when the recognition unit recognizes a second depression on the depression target object has been performed.

4. The information processing device according to claim 1, further comprising:
a response acquisition unit that acquires a response that indicates presence/absence of generation of the load weight by the user, after the user depresses the depression target object.

5. The information processing device according to claim 4, wherein
processing in which the load weight control unit performs control of randomly selecting and generating a plurality of the load weights, and
processing in which the response acquisition unit acquires the response to the load weight
are repeated, and
the information processing device further comprises
a threshold value calculation unit that calculates a threshold value that serves as an index of the load weight that can be discriminated by the user according to a ratio of a response that indicates presence of generation of the load weight for each of a plurality of the load weights acquired by the response acquisition unit.

6. The information processing device according to claim 5, wherein
the load weight control unit randomly selects the load weight from a range of 0.1 [N] to 1.4 [N].

7. The information processing device according to claim 4, further comprising:
a determination unit that determines whether or not a response acquired by the response acquisition unit is correct according to the load weight generated by the load weight control unit, and gives the user feedback of a correct/incorrect result of the response.

8. The information processing device according to claim 7, wherein
processing in which the load weight control unit performs control of randomly selecting and generating any one of generation of the load weight according to setting or stop of generation of the load weight,
processing in which the response acquisition unit acquires the response to the load weight, and
processing in which the determination unit gives the user feedback of a correct/incorrect result to a response acquired by the response acquisition unit
are repeated a specified number of times, and
the load weight control unit changes setting of the load weight to less than the load weight at present time in a case where a ratio of the specified number of times that the determination unit determines to be correct is equal to or greater than a predetermined ratio.

9. The information processing device according to claim 1, wherein
the depression target object is a keyboard of a piano, and
the recognition unit recognizes keystroke, in which the keyboard started to be depressed, and release key, in which the keyboard ended to be depressed and started to return.

10. The information processing device according to claim 4, wherein
the depression target object is a keyboard of a piano, and
the response acquisition unit is the keyboard of a discretionary musical scale other than the keyboard of a musical scale from which the load weight is generated.

11. The information processing device according to claim 1, further comprising:
an actuator that outputs torque for generating the load weight; and
a four-node link mechanism that has, as fixed ends, a rotation shaft of the actuator and a support shaft that supports the depression target object, and, as free ends, both ends of a slide member that transmits torque output from the actuator to the depression target object.

12. The information processing device according to claim 11, further comprising:
a haptic presentation unit that has the actuator and the four-node link mechanism, and presents haptic sensation to a user who depresses the depression target object, wherein
each of a plurality of the haptic presentation units that is arranged adjacent to each other independently presents haptic sensation.

13. The information processing device according to claim 11, wherein
current supplied to the actuator is stopped according to a frequency of depression on the depression target object or a predetermined specified time.

14. The information processing device according to claim 12, further comprising:
a force sensor that detects a force applied to the depression target object, wherein
initialization processing of the haptic presentation unit is performed for obtaining a relationship between current being supplied to the actuator and force detected by the force sensor.

15. The information processing device according to claim 12, wherein
haptic sensation presented by the haptic presentation unit that is predetermined among a plurality of the haptic presentation units is set to be different from haptic sensation presented by another of the haptic presentation unit, and
processing of acquiring a response when a user who has depressed the depression target object responses regarding the haptic presentation unit to which the user felt that haptic sensation was different
is repeated while changing setting of the haptic sensation to evaluate or train haptic sensation of a user.

16. The information processing device according to claim 12, wherein
predetermined haptic sensation is set in the haptic presentation unit, and
processing of detecting depression of the depression target object by a user
is repeated while changing setting of the haptic sensation to evaluate or train a motor function of a user's finger.

17. The information processing device according to claim 12, wherein
the haptic presentation unit is configured so that a default force that is required to depress the depression target object can be set in a state where no current is supplied to the actuator.

18. The information processing device according to claim 17, wherein
the haptic presentation unit has a tip end vicinity of the depression target object that is pushed down by a user, and has
a hammer mechanism whose one end is coupled to a predetermined shaft and another end is provided with a weight for generating a force that pushes down a rear end portion of the depression target object, and
a spring that generates a force that pushes down a rear end portion of the depression target object, and
the default force is set by adjusting a weight and moment of inertia of the hammer mechanism and a spring constant of the spring.

19. An information processing method comprising:
controlling, by an information processing device, generation of a load weight that becomes a load with respect to a motion when a user depresses a depression target object; and
recognizing, by the information processing device, a motion of the depression target object, wherein
the information processing device performs control of starting generation of the load weight that is predetermined at a timing when the depression target object has started to be depressed is recognized, and ending generation of the load weight at a timing when the depression target object ended to be depressed and started to return is recognized.

20. A program for causing a computer of an information processing device to execute processing comprising:

controlling generation of a load weight that becomes a load with respect to a motion when a user depresses a depression target object; and recognizing a motion of the depression target object, and performing control of starting generation of the load weight that is predetermined at a timing when the depression target object has started to be depressed is recognized, and ending generation of the load weight at a timing when the depression target object ended to be depressed and started to return is recognized.

* * * * *